(12) United States Patent
Tabata et al.

(10) Patent No.: US 11,566,966 B2
(45) Date of Patent: Jan. 31, 2023

(54) METHOD OF SPECIFYING LOCATION OF OCCURRENCE OF ABNORMAL SOUND, NON-TRANSITORY STORAGE MEDIUM, AND IN-VEHICLE DEVICE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Kota Fujii, Nissin (JP); Ken Imamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 172 days.

(21) Appl. No.: 17/157,399

(22) Filed: Jan. 25, 2021

(65) Prior Publication Data

US 2021/0302269 A1    Sep. 30, 2021

(30) Foreign Application Priority Data

Mar. 26, 2020  (JP) .............................. JP2020-055796

(51) Int. Cl.
*G01M 13/02* (2019.01)
*G07C 5/08* (2006.01)
*G10L 25/51* (2013.01)

(52) U.S. Cl.
CPC ........... *G01M 13/02* (2013.01); *G07C 5/0808* (2013.01); *G10L 25/51* (2013.01)

(58) Field of Classification Search
CPC .............................. G01M 13/02; G07C 5/0808
See application file for complete search history.

(56) References Cited

U.S. PATENT DOCUMENTS

| 4,593,582 A | * | 6/1986 | Sawada | ................. B60W 20/15 |
| | | | | 477/902 |
| 2016/0347306 A1 | | 12/2016 | Oyama | |
| 2019/0114849 A1 | * | 4/2019 | Lee | ..................... G01N 29/4427 |
| 2020/0118418 A1 | * | 4/2020 | Benjamin | ............ G08B 25/016 |
| 2021/0327175 A1 | * | 10/2021 | Yamamura | ............. G07C 5/008 |
| 2022/0099515 A1 | * | 3/2022 | Tabata | .................. F16H 61/143 |

(Continued)

FOREIGN PATENT DOCUMENTS

| DE | 10 2007 051 261 A1 | 4/2009 |
| DE | 10 2008 047 473 A1 | 4/2010 |

(Continued)

*Primary Examiner* — Eric S. McCall
(74) *Attorney, Agent, or Firm* — Oliff PLC

(57) ABSTRACT

There is provided a method of specifying a location of occurrence of an abnormal sound, the method including: storing mapping data in a storage device, the mapping data prescribing mapping that receives, as inputs, a sound variable that matches a sound detected in a vehicle and a state variable of a drive-system device of the vehicle synchronized with the sound, and that outputs a location as a main cause of the sound; executing a sound signal acquisition process of acquiring a sound signal output from a microphone that detects a sound; a state variable acquisition process of acquiring the state variable of the drive-system device; and a specifying process of specifying the location of occurrence of the sound corresponding to the sound signal using the sound variable and the state variable as inputs to the mapping. There are also provided a non-transitory storage medium and an in-vehicle device.

19 Claims, 10 Drawing Sheets

(56) References Cited

U.S. PATENT DOCUMENTS

| | | | |
|---|---|---|---|
| 2022/0108570 A1* | 4/2022 | Tabata | G01M 7/00 |
| 2022/0199107 A1* | 6/2022 | Ueda | G07C 5/0808 |
| 2022/0230483 A1* | 7/2022 | Shindo | G07C 5/0808 |

FOREIGN PATENT DOCUMENTS

| | | | | |
|---|---|---|---|---|
| DE | 10 2018 210 689 A1 | | 1/2020 | |
| DE | 102021112855 A1 | * | 11/2021 | G06F 16/635 |
| GB | 2 388 666 A | | 11/2003 | |
| JP | 2016-222090 A | | 12/2016 | |

* cited by examiner

FIG. 7
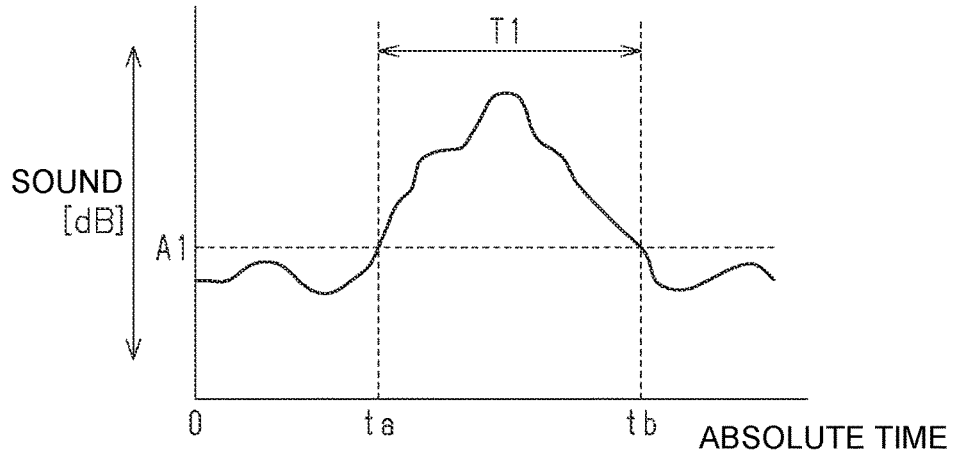
FIG. 8
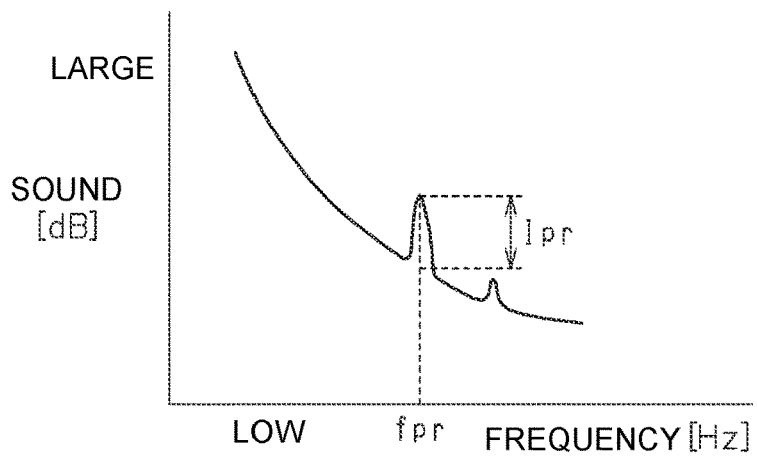
FIG. 9
| LARGEST SCORE | |
|---|---|
| Sc (1) | LOCATION OF ABNORMALITY NOT SPECIFIED |
| Sc (2) | OIL PUMP |
| Sc (3) | MG1 |
| Sc (4) | MG2 |
| Sc (5) | MESHING BETWEEN RING GEAR AND CARRIER OF POWER SPLIT DEVICE |
| Sc (6) | MESHING BETWEEN SUN GEAR AND CARRIER OF POWER SPLIT DEVICE |
| Sc (7) | MESHING OF COUNTER GEAR OF AT |

METHOD OF SPECIFYING LOCATION OF OCCURRENCE OF ABNORMAL SOUND, NON-TRANSITORY STORAGE MEDIUM, AND IN-VEHICLE DEVICE

CROSS-REFERENCE TO RELATED APPLICATION

This application claims priority to Japanese Patent Application No. 2020-055796 filed on Mar. 26, 2020, incorporated herein by reference in its entirety.

BACKGROUND

1. Technical Field

The present disclosure relates to a method of specifying the location of occurrence of an abnormal sound, a non-transitory storage medium, and an in-vehicle device.

2. Description of Related Art

Japanese Unexamined Patent Application Publication No. 2016-222090 (JP 2016-222090 A) describes a device provided in a hybrid vehicle, in which a motor generator and an internal combustion engine are mechanically coupled to a power split device that includes a gear train, the device suppressing an abnormal sound due to play in the gear train. This device controls torque of the motor generator in order to apply push torque to the gear train in the case where an abnormal sound generation condition determined in advance is met.

SUMMARY

An abnormal sound is not necessarily generated in an assumed situation. Thus, it is not always easy to specify the main cause of an abnormal sound when a user detects and reports the abnormal sound. The present disclosure provides a method of specifying the location of occurrence of an abnormal sound, a non-transitory storage medium for executing the method, and an in-vehicle device that executes the method.

A first aspect of the present disclosure is directed to a method of specifying a location of occurrence of an abnormal sound. The method of specifying a location of occurrence of an abnormal sound includes executing the following processes. That is, mapping data are stored in a storage device, the mapping data prescribing mapping that receives, as inputs, a sound variable, which is a variable that matches a sound detected in a vehicle, and a state variable of a drive-system device of the vehicle, which is synchronized with the sound, and that outputs a location as a main cause of the sound. An execution device is caused to execute a sound signal acquisition process of acquiring a sound signal output from a microphone that detects the sound in the vehicle with the mapping data stored. The execution device is caused to execute a state variable acquisition process of acquiring the state variable of the drive-system device with the mapping data stored. The execution device is caused to execute a specifying process of specifying the location of occurrence of the sound corresponding to the sound signal using the sound variable that is based on the sound signal acquired through the sound signal acquisition process, and the state variable that is synchronized with the sound signal, as inputs to the mapping.

In the case where an abnormal sound is generated in a vehicle, the abnormal sound is not necessarily generated at all times, but is occasionally generated only when a drive-system device is in a specific state. In that case, it may be difficult to reproduce the abnormal sound when the vehicle with the abnormal sound is taken to a repair shop etc.

Thus, with the method according to the aspect described above, the location of occurrence of a sound can be specified by using mapping that receives the sound variable and the state variable at the time when an abnormal sound is generated as input variables and that outputs a location as a main cause of the sound.

In the method according to the first aspect, the sound signal acquisition process may include a process of acquiring the sound signal on condition that the microphone is placed at a predetermined location specified in advance. The predetermined location may be one of a head portion of a driver's seat of the vehicle, a dashboard, a middle portion of a rear seat, and a center console.

With the method according to the configuration described above, it is possible to suppress a difference in the condition for acquiring an abnormal sound between the time of learning of the mapping data and the time of execution of the specifying process of specifying the location of occurrence of an abnormal sound using the mapping, by designating the location of placement of the microphone for acquiring the sound signal.

In the case where the predetermined location is the head portion of the driver's seat of the vehicle, the sound signal can be acquired under the same condition as the condition under which the driver detects the abnormal sound. In the case where the predetermined location is the dashboard or the center console, the sound signal can be acquired under a condition that is similar to the condition under which the driver detects the abnormal sound. In the case where the predetermined location is the middle portion of the rear seat, the sound signal can be acquired under a condition that is similar to the condition under which a person seated in a rear seat detects the sound.

In the method according to the first aspect, the sound signal acquisition process may include a process of acquiring the sound signal with the vehicle in a placement state determined in advance. The placement state determined in advance may be a state in which the vehicle is surrounded from at least four directions excluding one direction, the four directions including front, rear, right, and left sides of the vehicle, and two directions including upper and lower sides of the vehicle.

In the case where the vehicle is surrounded, a sound generated in the vehicle is reflected by an object that surrounds the vehicle. Thus, a sound generated in the vehicle tends to be annoying to the ears of a user in the vehicle in the case where the vehicle is surrounded, compared to the case where the vehicle is not surrounded. Therefore, in the case where a user who noticed an abnormal sound in a shed etc. takes a vehicle to a repair shop, for example, the abnormal sound may not be reproduced when it is attempted to reproduce the abnormal sound with the vehicle in a non-surrounded state.

Thus, with the method according to the configuration described above, it is possible to reproduce an abnormal sound that cannot be reproduced when the vehicle is in a non-surrounded state, by acquiring the sound signal with the vehicle surrounded from at least three directions out of four directions including the front, rear, right, and left sides of the vehicle and from the upper and lower sides.

The method according to the first aspect may further include causing the execution device to execute an instruction process of providing an instruction for a prescribed drive operation determined in advance for the vehicle when an output of the mapping indicates that probabilities of two or more of a plurality of candidates for the location as the main cause of the abnormal sound are higher than probabilities of other candidates by a predetermined value or more. The mapping may output a variable that indicates respective relative probabilities of the candidates. The specifying process may include a process of specifying the location of occurrence of the sound corresponding to the sound signal, when the instruction process is performed, using the sound variable that is based on the sound signal acquired through the sound signal acquisition process performed when the drive operation according to the instruction process is performed, and the state variable that is acquired through the state variable acquisition process, as the inputs to the mapping.

In general, even in the case where a plurality of candidates for the location of occurrence of an abnormal sound cannot be narrowed down to one, there tends to be a difference, among the candidates, in the likelihood of occurrence of an abnormal sound etc. according to the state of a drive-system device. Thus, with the method of specifying a location of occurrence of an abnormal sound according to the configuration described above, it is possible to acquire a sound signal and a state variable that allow easy identification of a plurality of candidates for the location of occurrence of an abnormal sound in the case where such candidates cannot be narrowed down to one, by providing an instruction for a prescribed drive operation and acquiring a sound signal and a state variable at that time. Thus, with the method described above, the precision in specifying the location of occurrence of an abnormal sound can be enhanced.

The method according to the first aspect may further include executing a sound variable generation process of receiving the sound signal as an input and generating, as the sound variable, at least one of three including an intensity of frequency components of the sound signal respectively corresponding to a predetermined frequency that is proportional to a rotational frequency of a rotary machine as a thrust generation device of the vehicle acquired through the state variable acquisition process and frequencies that are integer multiples of the predetermined frequency, a frequency of projection that is a frequency in a frequency band in which an intensity of the sound signal is high compared to frequency bands on a low-frequency side and a high-frequency side that are adjacent to the frequency band and an amount of projection which is an amount of projection of the intensity at the frequency of projection with respect to the adjacent frequency bands, and a duration time for which the intensity of the sound signal is equal to or more than a predetermined value.

With the method described above, extracting an effective characteristic amount from the sound signal makes it possible to achieve mapping with a high generalization performance and a high precision in specification of the main cause for a small dimension of the variable to be input to the mapping. The drive-system device has a part that rotates along with rotation of the rotary machine. Thus, in the case where an abnormal sound is generated along with rotation of the drive-system device, the intensity of a sound of a frequency component that is proportional to the rotational frequency of the rotary machine tends to be especially high. Thus, in the case where an abnormal sound is generated along with rotation of the drive-system device, the location of occurrence of the abnormal sound can be specified precisely for a small dimension of the variable to be input to the mapping, by using the intensity of frequency components corresponding to the predetermined frequency and frequencies that are integer multiples thereof as the sound variable.

In the case where there is a frequency of projection, an abnormal sound to be detected by the user tends to be generated. Therefore, information that is appropriate for specifying an abnormal sound for a small dimension of the variable to be input to the mapping can be input to the mapping, by using the frequency of projection and the amount of projection as the sound variable. Thus, the location of occurrence of the abnormal sound can be specified precisely for a small dimension of the variable to be input to the mapping.

The duration time for which the intensity of the sound signal is equal to or more than the predetermined value has a correlation with the time for which the abnormal sound is generated. The duration time for which the abnormal sound is generated tends to fluctuate in accordance with the location of occurrence of the abnormal sound. Therefore, the location of occurrence of the abnormal sound can be specified precisely for a small dimension of the variable to be input to the mapping, by using the duration time as the sound variable.

In the method according to the first aspect, the state variable acquisition process may include a process of acquiring, as the state variable, at least one of torque of a thrust generation device of the vehicle and an amount of variation in the torque per unit time.

In the case where an abnormal sound is generated from a drive system of the vehicle, the abnormal sound tends to be generated when torque of the thrust generation device or the amount of variation in the torque per unit time has a specific value. With the method of specifying a location of occurrence of an abnormal sound according to the configuration described above, the location of occurrence of the abnormal sound can be specified precisely for a small dimension of the variable to be input to the mapping, by using such a value as the variable to be input to the mapping. In particular, an abnormal sound tends to be generated in the case where the amount of variation in the torque is large, and thus the precision in specifying the location of occurrence of an abnormal sound can be enhanced easily if the amount of variation in the torque is used as the input variable.

In the method according to the first aspect, the vehicle may include a speed change device that changes a ratio between a rotational speed of the rotary machine as the thrust generation device and a rotational speed of drive wheels. The state variable acquisition process may include a process of acquiring a speed ratio of the speed change device as the state variable.

In the case where an abnormal sound is generated from a drive system of the vehicle, the abnormal sound is occasionally generated when the speed ratio of the speed change device is a predetermined ratio. In addition, the speed ratio can represent the vehicle speed in cooperation with the rotational speed of the in-vehicle rotary machine, and can represent the rotational frequency of a rotary part of the drive-system device. An abnormal sound generated in the vehicle is occasionally generated at a specific vehicle speed. In the case where an abnormal sound is generated, in addition, the intensity of the sound signal occasionally becomes high in a predetermined frequency band that is proportional to the rotational frequency of a drive-system part.

With the method according to the configuration described above, the location of occurrence of the abnormal sound can be specified precisely for a small dimension of the variable to be input to the mapping, by utilizing the speed ratio which is a variable that is effective in specifying the type of an abnormal sound for the reason discussed above.

In the method according to the first aspect, the state variable acquisition process may include a process of acquiring, as the state variable, at least one of a vehicle speed and a rotational speed of a rotary machine as a thrust generation device of the vehicle.

An abnormal sound generated in the vehicle is occasionally generated at a specific vehicle speed. In addition, the rotational speed of a rotary machine is a variable that is effective in specifying the state of the drive-system device. With the method of specifying a location of occurrence of an abnormal sound according to the configuration described above, the location of occurrence of the abnormal sound can be specified precisely for a small dimension of the variable to be input to the mapping, by utilizing the vehicle speed or the rotational speed of the rotary machine which is a variable that is effective in specifying the type of an abnormal sound for the reason discussed above.

In the method according to the first aspect, the vehicle may include an internal combustion engine, a rotary electric machine that is mechanically connectable to a crankshaft of the internal combustion engine, and a control device that executes a superposing process of superposing cancel torque, which is torque for reducing pulsation in torque of the internal combustion engine, on torque required for the rotary electric machine. The state variable acquisition process may include a process of acquiring a magnitude of the cancel torque as the state variable.

There occurs a significant difference in vibration due to fluctuations in torque of the crankshaft of the internal combustion engine between the case where the control device performs control so as to apply the cancel torque and the case where such control is not performed. Thus, in the case where an abnormal sound is generated, the main cause of occurrence of the abnormal sound may be different in accordance with whether control is performed so as to apply the cancel torque at that time. With the method of specifying a location of occurrence of an abnormal sound according to the configuration described above, the precision in specifying the location of occurrence of the abnormal sound can be enhanced by including the magnitude of the cancel torque in the variable to be input to the mapping.

In the method according to the first aspect, the vehicle may include an internal combustion engine, a first motor generator, a second motor generator, and a control device. The second motor generator may be mechanically connectable to the internal combustion engine and the first motor generator via a power split device, and mechanically coupled to drive wheels not via the power split device. The control device may execute a process of causing the first motor generator to generate push torque for filling play in a gear train of the power split device during no-load operation of the internal combustion engine and the first motor generator. The state variable acquisition process may include a process of acquiring a magnitude of the push torque as the state variable.

There occurs a significant difference in noise due to play in the gear train of the power split device between the case where the control device performs control so as to apply the push torque and the case where such control is not performed. Thus, in the case where an abnormal sound is generated, the main cause of occurrence of the abnormal sound may be different in accordance with whether control is performed so as to apply the push torque at that time. With the method of specifying a location of occurrence of an abnormal sound according to the configuration described above, the precision in specifying the location of occurrence of the abnormal sound can be enhanced by including the push torque in the variable to be input to the mapping.

In the method according to the first aspect, the execution device may include a first execution device provided in the vehicle, and a second execution device and a third execution device not provided in the vehicle. The first execution device may execute the state variable acquisition process and a vehicle-side transmission process of transmitting the state variable acquired through the state variable acquisition process. The second execution device may be a portable terminal of a user of the vehicle which includes the microphone, and may execute a state variable reception process of receiving the state variable transmitted through the vehicle-side transmission process, the sound signal acquisition process, and a terminal-side transmission process of transmitting the sound signal acquired through the sound signal acquisition process and the state variable received through the state variable reception process. The third execution device may execute an analysis-side reception process of receiving the sound signal and the state variable transmitted through the terminal-side transmission process from each of portable terminals of users of a plurality of vehicles, and the specifying process.

With the method according to the configuration described above, the specifying process is executed by the third execution device which is external to the vehicle. Thus, abnormal sound information on a plurality of vehicles can be collected by the third execution device. In addition, the portable terminal transmits the state variable and the sound signal to the third execution device. Thus, the requirements for the first execution device can be reduced.

In the method according to the configuration described above, the second execution device may execute a notification acquisition process of acquiring a notification indicating, when a person has detected the abnormal sound, that the person has detected the abnormal sound. The sound signal to be transmitted through the terminal-side transmission process may be the sound signal acquired through the sound signal acquisition process in a predetermined period determined in accordance with a timing when the notification is acquired through the notification acquisition process.

With the method according to the configuration described above, a notification indicating that a person has detected an abnormal sound is made when the person has detected the abnormal sound, and the second execution device transmits the sound signal for a predetermined period determined in accordance with the timing when the notification is acquired. This allows the third execution device to perform the specifying process using the sound signal for the time when the abnormal sound is actually generated while minimizing the amount of data to be handled.

In the method according to the configuration described above, the second execution device may execute an additional variable acquisition process of acquiring an additional variable which is a variable that indicates at least one of an opening and closing state of a window of the vehicle at a time when the abnormal sound is detected and a situation of the vehicle. The terminal-side transmission process may include a process of transmitting the additional variable in addition to the sound signal and the state variable. The analysis-side reception process may include a process of receiving the additional variable. The inputs to the mapping may include the additional variable in addition to the sound variable and the state variable. The specifying process may include a process of specifying the location of occurrence of the sound corresponding to the sound signal using the sound variable, the state variable, and the additional variable as the inputs to the mapping.

With the method according to the configuration described above, by inputting the additional variable to the mapping in addition to the sound variable and the state variable, it is possible to provide the mapping with detailed information on the situation of occurrence of the abnormal sound, and hence to precisely specify the location of occurrence of the abnormal sound, compared to the case where the additional variable is not used.

A second aspect of the present disclosure provides a non-transitory storage medium storing instructions that are executable by one or more processors and that cause the one or more processors to perform functions. The storage medium executes the processes executed by the second execution device in the method described above.

A third aspect of the present disclosure provides an in-vehicle device including the first execution device in the method described above.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a time chart illustrating a characteristic amount according to the first embodiment;

FIG. 8 illustrates a characteristic amount according to the first embodiment;

FIG. 9 illustrates a list of data on determination results according to the first embodiment;

DETAILED DESCRIPTION OF EMBODIMENTS

A method of specifying the location of occurrence of an abnormal sound according to a first embodiment of the present disclosure will be described below with reference to the drawings.

Figure 1:
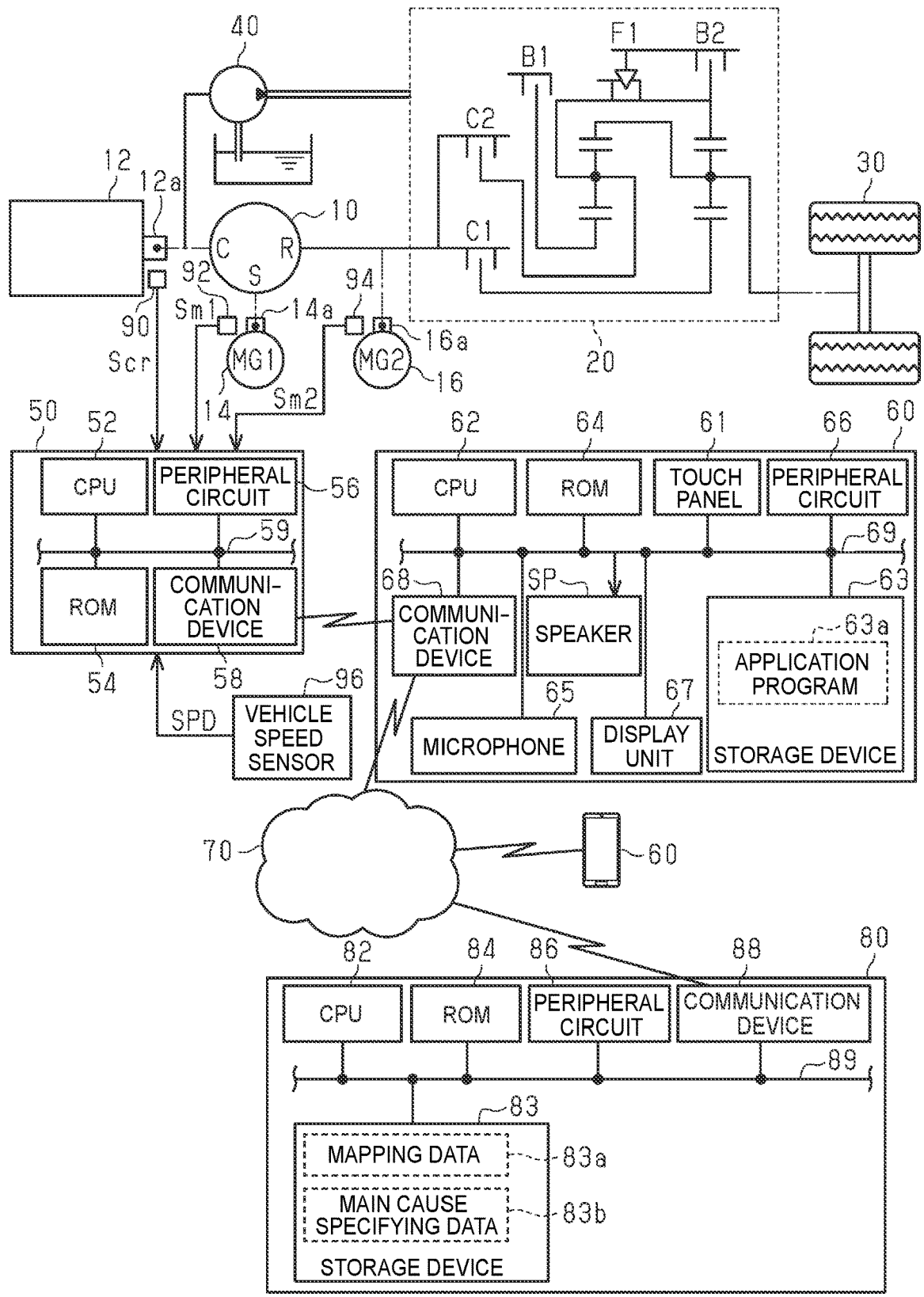
FIG. 1 is a block diagram illustrating the configuration of a system according to a first embodiment of the present disclosure.

As illustrated in FIG. 1, a power split device 10 of a vehicle includes a planetary gear mechanism that includes a sun gear S, a carrier C, and a ring gear R. A crankshaft 12a of an internal combustion engine 12 is mechanically coupled to the carrier C of the power split device 10. A rotary shaft 14a of a first motor generator 14 is mechanically coupled to the sun gear S. A rotary shaft 16a of a second motor generator 16 is mechanically coupled to the ring gear R. In addition, drive wheels 30 are mechanically coupled to the ring gear R via a speed change device 20 that includes clutches C1 and C2, brakes B1 and B2, and a one-way clutch F1.

Working oil discharged from an oil pump 40, a driven shaft of which is mechanically coupled to the carrier C of the power split device 10, is supplied to the speed change device 20. A control device 50 controls the vehicle, and controls control amounts such as torque and the exhaust component ratio of the internal combustion engine 12, torque of the first motor generator 14, and torque of the second motor generator 16. In order to control the control amounts, the control device 50 references an output signal Scr from a crank angle sensor 90, an output signal Sm1 from a first rotational angle sensor 92 that detects the rotational angle of the rotary shaft 14a of the first motor generator 14, and an output signal Sm2 from a second rotational angle sensor 94 that detects the rotational angle of the rotary shaft 16a of the second motor generator 16. The control device 50 also references a vehicle speed SPD detected by a vehicle speed sensor 96.

The control device 50 includes a central processing unit (CPU) 52, a read only memory (ROM) 54, a peripheral circuit 56, and a communication device 58, which can communicate with each other via a local network 59. The peripheral circuit 56 includes a circuit that generates a clock signal that prescribes internal operation, a power source circuit, a reset circuit, etc. The control device 50 controls the control amounts by the CPU 52 executing a program stored in the ROM 54.

The control device 50 can communicate with a portable terminal 60 of a user of the vehicle via the communication device 58. The portable terminal 60 includes a CPU 62, a storage device 63 which is a non-volatile memory that is electrically rewritable, a ROM 64, a microphone 65, a peripheral circuit 66, a display unit 67 such as a liquid crystal display (LCD), for example, a touch panel 61 disposed so as to be superposed on the display unit 67, a speaker SP, and a communication device 68, which can communicate with each other via a local network 69.

The portable terminal 60 can communication with a different portable terminal 60 and a data analysis center 80 via a global network 70, in addition to being able to communicate with the control device 50 via the communication device 68. In FIG. 1, one portable terminal 60, the internal structure of which such as the CPU 62 is not illustrated, is illustrated as an example of the different portable terminal 60.

The data analysis center 80 includes a CPU 82, a storage device 83 which is a non-volatile memory that is electrically rewritable, a ROM 84, a peripheral circuit 86, and a communication device 88, which can communicate with each other via a local network 89.

Figure 2A:
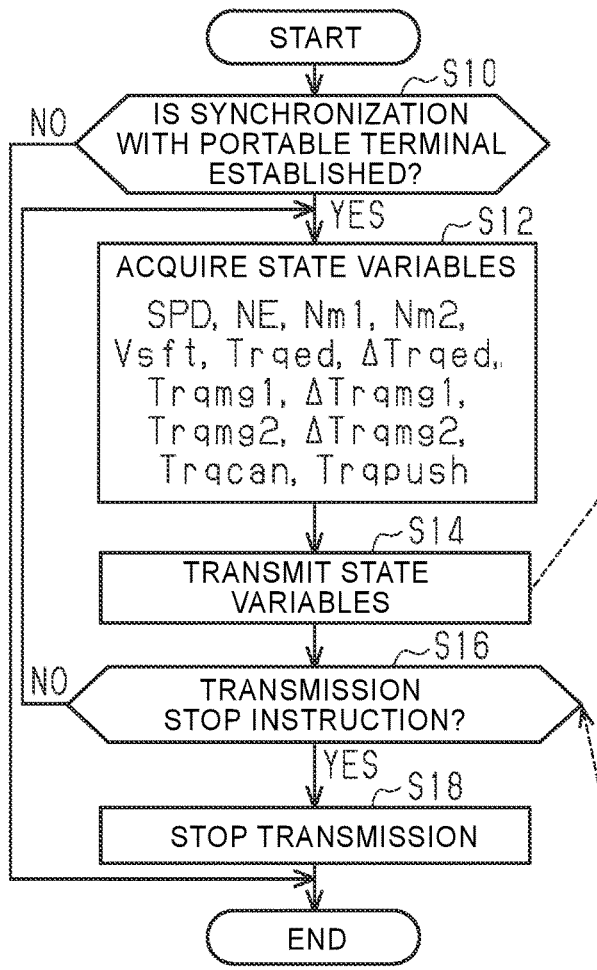
FIG. 2A is a flowchart illustrating the procedures of processes executed by a control device of the system.
Figure 2B:
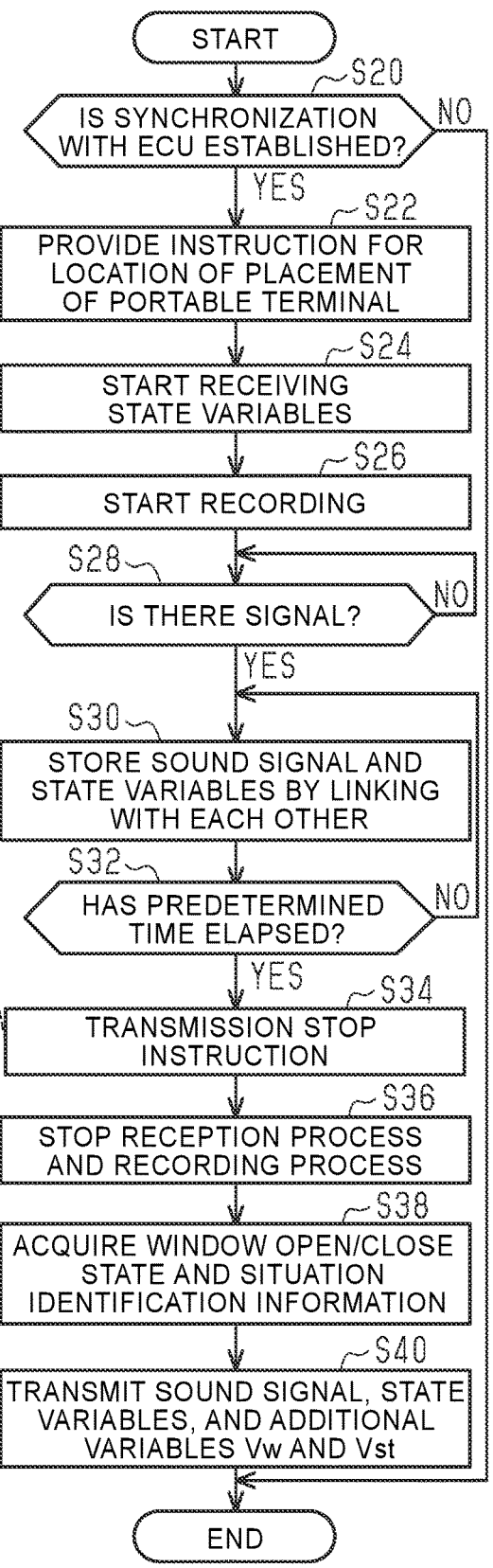
FIG. 2B is a flowchart illustrating the procedures of processes executed by a portable terminal of the system.

The system illustrated in FIG. 1 constitutes a system that specifies the location of occurrence of an abnormal sound generated in the vehicle. The processes related to the method of specifying the location of occurrence of an abnormal sound will be discussed in detail below. FIGS. 2A and 2B illustrate the procedures of processes executed by the control device 50 of the vehicle and the portable terminal 60 of the user of the vehicle. Particularly, the processes indicated in FIG. 2A are implemented when the CPU 52 of the control device 50 executes the program stored in the ROM 54 repeatedly at predetermined periods, for example. Meanwhile, the processes indicated in FIG. 2B are implemented by the CPU 62 of the portable terminal 60 executing an application program 63a stored in the storage device 63 repeatedly at predetermined periods, for example. In the following, the respective step numbers of the processes are represented by numerals preceded by the letter "S". In the following, the processes in FIGS. 2A and 2B are described in the chronological order of the processes executed by the control device 50 and the portable terminal 60.

In the sequence of processes indicated in FIG. 2A, the CPU 52 first determines whether synchronization with the portable terminal 60 is established (S10). In the case where it is determined that such synchronization is established (S10: YES), the CPU 52 acquires state variables of drive-system devices of the vehicle (S12). In the present first embodiment, the state variables include the vehicle speed SPD, a rotational speed NE of the crankshaft 12a of the internal combustion engine 12, a rotational speed Nm1 of the rotary shaft 14a of the first motor generator 14, and a rotational speed Nm2 of the rotary shaft 16a of the second motor generator 16. The rotational speed NE is calculated by the CPU 52 using the output signal Scr from the crank angle sensor 90 as an input. The rotational speed Nm1 is calculated by the CPU 52 using the output signal Sm1 from the first rotational angle sensor 92 as an input. The rotational speed Nm2 is calculated by the CPU 52 using the output signal Sm2 from the second rotational angle sensor 94 as an input.

The state variables also include a speed ratio variable Vsft which is a variable that indicates the speed ratio of the speed change device 20, required torque Trqed which is torque required for the internal combustion engine 12 in order to generate power required for the vehicle, and an amount of variation ΔTrqed in the required torque Trqed per unit time. The state variables additionally include required torque Trqmg1 which is torque required for the first motor generator 14 in order to generate the power, an amount of variation ΔTrqmg1 in the required torque Trqmg1 per unit time, required torque Trqmg2 which is torque required for the second motor generator 16 in order to generate the power, and an amount of variation ΔTrqmg2 in the required torque Trqmg2 per unit time. The required torques Trqmg1 and Trqmg2 are not necessarily positive values. That is, the required torque Trqmg1 may have a sign corresponding to power generation so that power of the internal combustion engine 12 is appropriately split by the power split device 10, for example. Meanwhile, the required torque Trqmg2 has a sign corresponding to power generation when negative power is required for the vehicle such as when deceleration of the vehicle is requested.

Figure 3:
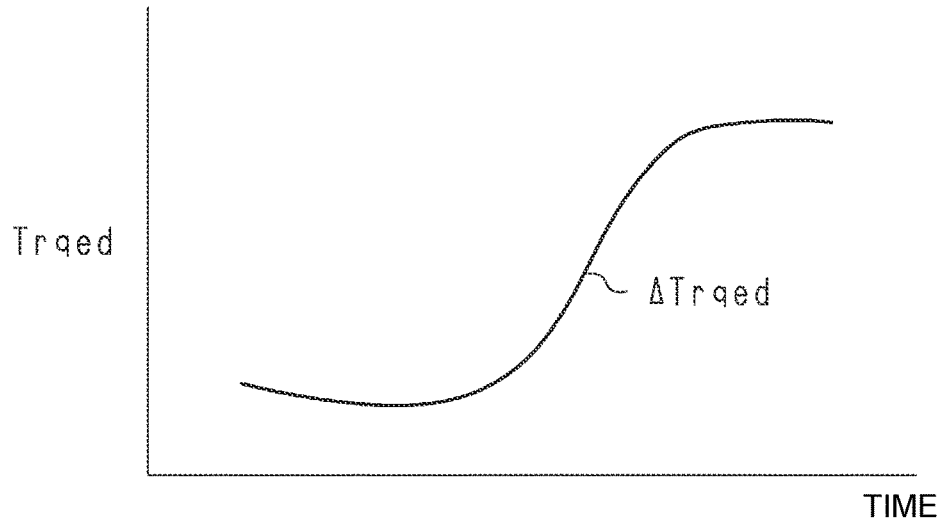
FIG. 3 is a time chart illustrating a characteristic amount according to the first embodiment.

The amounts of variation ΔTrqed, ΔTrqmg1, and ΔTrqmg2 are variables that have a strong positive correlation with an abnormal sound. That is, an abnormal sound tends to occur when the amount of variation ΔTrqed becomes large as indicated in FIG. 3 for the amount of variation ΔTrqed. An abnormal sound tends to occur especially when torque switches from one of a pair of positive and negative signs to the other, and thus the amount of variation in torque at the time when torque switches can be important information for specifying an abnormal sound. Thus, information on the amount of variation at the time when the signs of the required torques Trqed, Trqmg1, and Trqmg2 are switched, which is particularly important information for specifying an abnormal sound, can be obtained using the amounts of variation ΔTrqed, ΔTrqmg1, and ΔTrqmg2 in addition to the required torques Trqed, Trqmg1, and Trqmg2.

Returning to FIGS. 2A and 2B, the state variables include cancel torque Trqcan and push torque Trqpush. The cancel torque Trqcan is torque applied to the power split device 10 by the first motor generator 14 and the second motor generator 16 in order to cancel out periodic fluctuations in torque of the internal combustion engine 12, the period of which corresponds to the intervals of appearance of the combustion stroke of the internal combustion engine 12, in the power split device 10. The cancel torque Trqcan is torque appropriately allocated to and superposed on the required torque Trqmg1 for the first motor generator 14 and the required torque Trqmg2 for the second motor generator 16.

Figure 4:
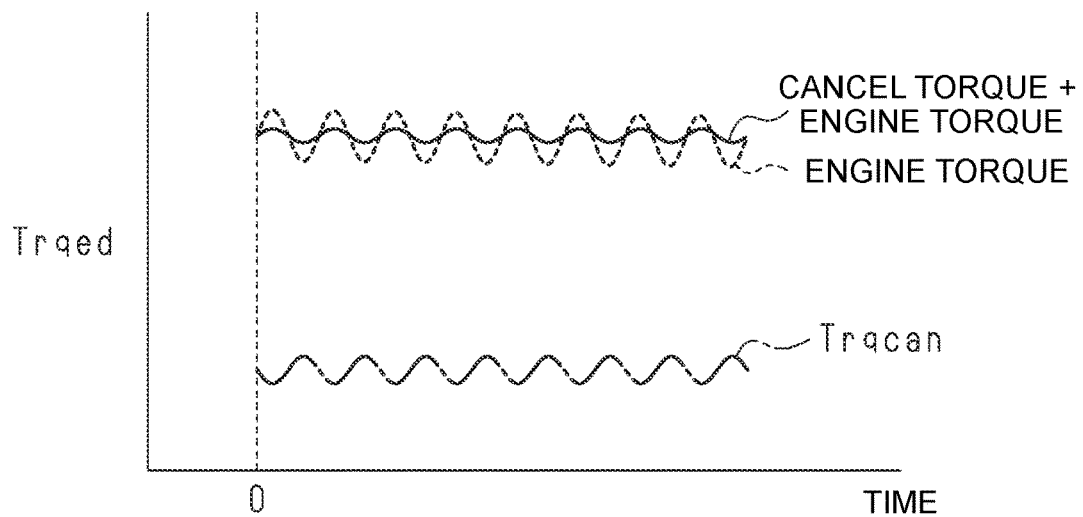
FIG. 4 is a time chart illustrating a characteristic amount according to the first embodiment.

In FIG. 4, torque of the internal combustion engine 12 is indicated by the dashed line, and total torque of the torque of the internal combustion engine 12 and the cancel torque Trqcan is indicated by the continuous line. The cancel torque Trqcan periodically fluctuates as with the torque of the internal combustion engine 12 as indicated by the long dashed short dashed line in FIG. 4. In the present first embodiment, the value of the amplitude of the cancel torque Trqcan is used as the state variable described above. This is one method of quantifying the magnitude of the cancel torque Trqcan.

Meanwhile, the push torque Trqpush is torque for suppressing an abnormal sound due to play in a gear train of the power split device 10, and is torque to be applied to the power split device 10 by the first motor generator 14. The push torque Trqpush is calculated by the CPU 52 in the case where a condition determined in advance, such as a condition that a drive force is applied to the drive wheels 30 using only power of the second motor generator 16, for example, is met.

Returning to FIGS. 2A and 2B, when the state variables are acquired, the CPU 52 transmits the state variables by operating the communication device 58 (S14).

Meanwhile, as illustrated in FIG. 2B, the CPU 62 determines whether synchronization with the control device 50 is established (S20). In the case where it is determined that such synchronization is established (S20: YES), the CPU 62 displays, on the display unit 67, instruction information about where in the vehicle the portable terminal 60 should be placed by operating the display unit 67 (S22).

Figure 5:
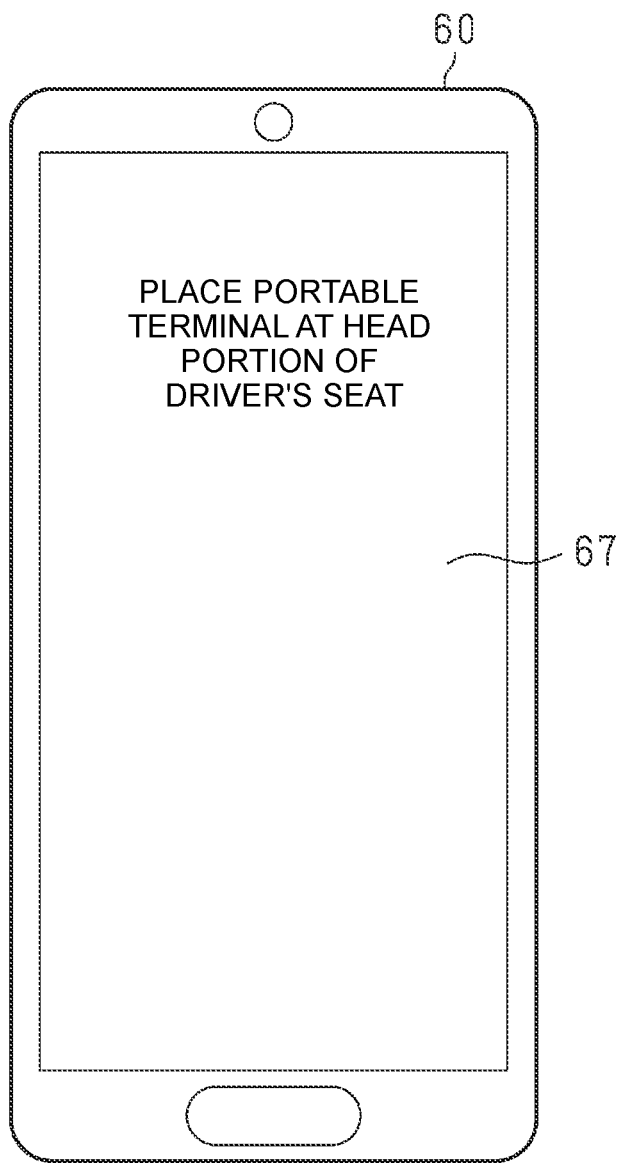
FIG. 5 illustrates an example of an instruction for the location of placement of the portable terminal according to the first embodiment.

FIG. 5 illustrates an example of the instruction information displayed on the display unit 67. In the present first embodiment, it is assumed that the portable terminal 60 is placed at a head portion of a driver's seat in order for the portable terminal 60 to record an abnormal sound heard at the head of the user. Therefore, the CPU 62 displays, on the display unit 67, instruction information saying "Please place the portable terminal at the head portion of the driver's seat." as visual information.

Returning to FIG. 2B, the CPU 62 starts receiving the state variables transmitted from the control device 50 (S24). Next, the CPU 62 starts recording an output signal from the microphone 65 (S26). The CPU 62 monitors, based on the output signal from the microphone 65, whether there is a signal from the user indicating that he/she has detected an abnormal sound (S28: NO). For example, a signal such as "now", "start", and "noise" is determined in advance, and the presence or absence of such a signal is monitored. In the case where it is determined that there is a signal (S28: YES), the CPU 62 stores, in the storage device 63, chronological data on a sound signal captured by the microphone 65 for a predetermined period including a predetermined time before and after the time when the signal is detected, by linking with chronological data on the received state variables (S30). That is, the CPU 62 stores, in the storage device 63, the state variables which were received no earlier than the predetermined time before the timing when the signal was made and the sound signal which was captured no earlier than the predetermined time before such a timing. The CPU 62 deletes data for a period outside the predetermined period.

The CPU 62 executes the process in S30 until it is determined that the predetermined time has elapsed since the signal, or in other words until it is determined that the predetermined period has expired (S32: NO). In the case where it is determined that the predetermined time has elapsed (S32: YES), the CPU 62 transmits an instruction to stop transmission of the state variables to the control device 50 by operating the communication device 68 (S34).

Meanwhile, as indicated in FIG. 2A, when the transmission stop instruction is received (S16: YES), the CPU 52 stops the process of transmitting the state variables (S18). The CPU 52 temporarily ends the sequence of processes indicated in FIG. 2A in the case where the process in S18 is completed or in the case where a negative determination is made in the process in S10.

Meanwhile, as illustrated in FIG. 2B, the CPU 62 stops the state variable receiving process and the recording process (S36). Next, the CPU 62 acquires the open/close state of windows of the vehicle and vehicle situation identification information for identifying several situations determined in advance, such as whether the vehicle is positioned in an urban area or on a highway, stationary in a parking lot, etc. (S38). This process is implemented by the CPU 62 displaying, on the display unit 67, visual information that prompts the user to input the open/close state of the windows of the vehicle and the vehicle situation identification information by operating the display unit 67. That is, the user inputs the open/close state of the windows and the vehicle situation identification information via the touch panel 61 in response to the visual information displayed on the display unit 67.

Next, the CPU 62 transmits the sound signal, the state variables, and additional variables to the data analysis center 80 by operating the communication device 68 (S40). In the present first embodiment, the additional variables include a window variable Vw, which is a variable that indicates the open/close state of the windows, and an identification variable Vst, which is a variable that indicates the vehicle situation identification information. The CPU 62 temporarily ends the sequence of processes indicated in FIG. 2B in the case where the process in S40 is completed or in the case where a negative determination is made in the process in S20.

Figure 6:
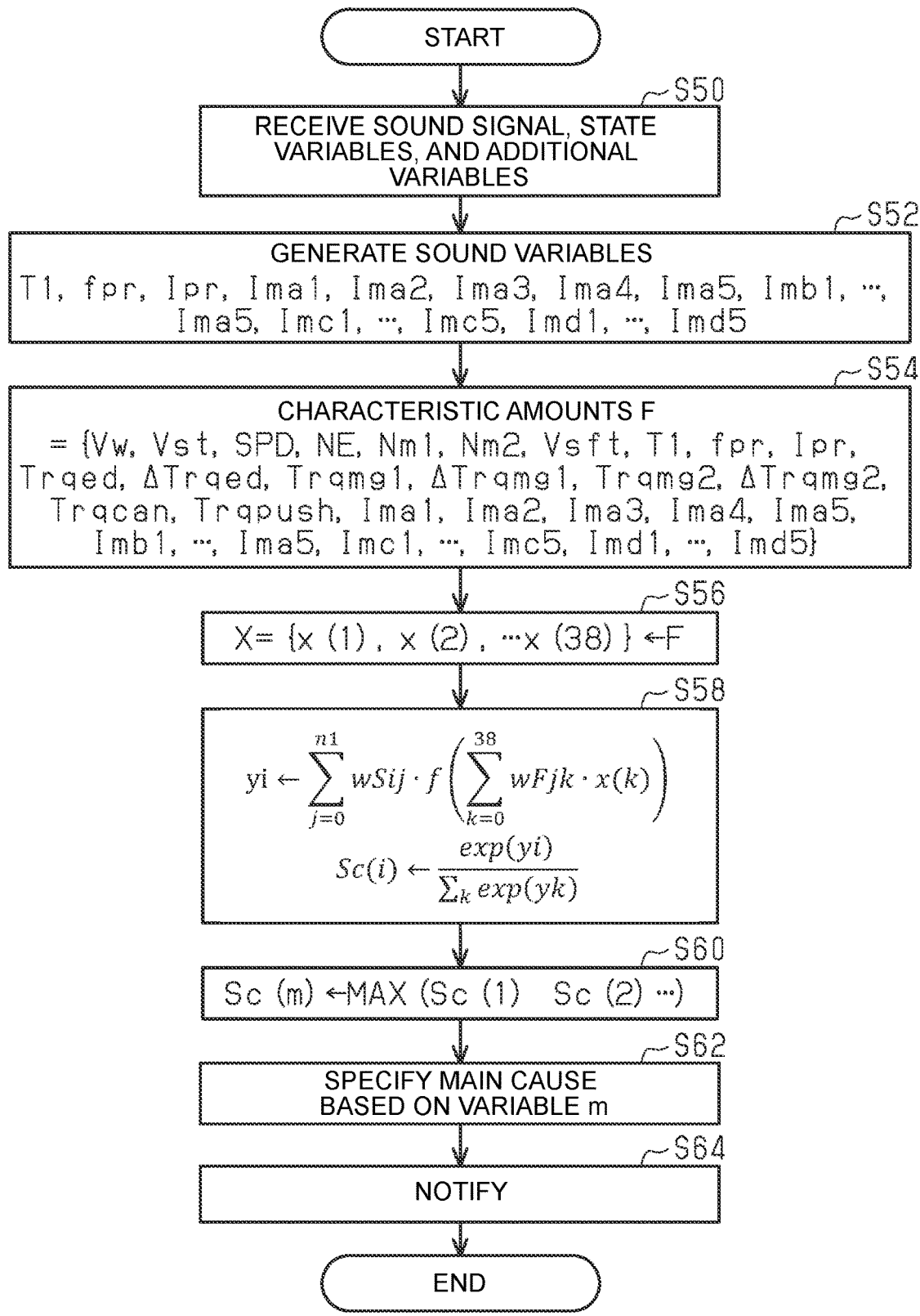
FIG. 6 is a flowchart illustrating the procedures of processes executed by a data analysis center according to the first embodiment.

FIG. 6 illustrates the procedures of processes executed by the data analysis center 80. The processes indicated in FIG. 6 are implemented when the CPU 82 executes the program stored in the ROM 84 repeatedly at predetermined periods, for example.

In the sequence of processes indicated in FIG. 6, the CPU 62 first receives the sound signal, the state variables, and the additional variables transmitted from the portable terminal 60 (S50). Next, the CPU 82 executes a process of generating characteristic amounts from the sound signal and using the characteristic amounts as sound variables (S52). In the present first embodiment, the sound variables include a duration time T1 for which the intensity (dB) of the sound signal is equal to or more than a predetermined value.

FIG. 7 illustrates an example of the duration time T1. In the example illustrated in FIG. 7, the intensity of the sound signal is equal to or more than a predetermined value A1 for a period from time ta to tb, and the duration time T1 for which the intensity of the sound signal is equal to or more than the predetermined value A1 is used as a sound variable.

Returning to FIG. 6, the sound variables include a frequency of projection fpr, which is a frequency in a frequency band in which the intensity of the sound signal projects compared to frequency bands on the low-frequency side and the high-frequency side that are adjacent to the frequency band, and an amount of projection Ipr.

FIG. 8 illustrates an example of the frequency of projection fpr and the amount of projection Ipr. In the present first embodiment, the frequency of projection fpr and the amount of projection Ipr are used as sound variables in view of the fact that an abnormal sound tends to be generated if there is a portion at which the intensity of the sound signal projects as indicated in FIG. 8. The CPU 82 defines the frequency of projection fpr and the amount of projection Ipr in the case where the intensity of the sound signal in the target frequency band is more than the intensity of the sound signal on the low-frequency side and the high-frequency side by a predetermined amount or more.

Returning to FIG. 6, the sound variables include sound pressures Ima1, Imb1, Imc1, and Imd1 of frequency components related to meshing in a gear train of the power split device 10 or the speed change device 20, and sound pressures Iman, Imbn, Imcn, and Imdn of the "n−1:n=2 to 5"-order harmonic components of the frequency components. Examples of the frequency related to meshing in a gear train include the reciprocal of the time required to vary the meshing between the sun gear S and a gear of the carrier C of the power split device 10. The CPU 62 can calculate the frequency related to the meshing between the sun gear S and the gear of the carrier C as the reciprocal of the time required to vary the meshing between the sun gear S and the gear of the carrier C using the rotational speeds NE, Nm1, and Nm2 as inputs and based on the number of teeth of the sun gear S and the number of teeth of the carrier C.

In the present first embodiment, the CPU 82 calculates four frequencies corresponding to a, b, c, and d as frequencies related to meshing using the rotational speeds NE, Nm1, and Nm2 as inputs. Examples of the four frequencies according to the present first embodiment include a frequency related to the meshing between the ring gear R and the carrier C and a frequency related to the meshing of a counter gear of the speed change device 20, besides that discussed above.

Specifically, the CPU 82 calculates the sound pressures Imanto Imdn (n=1 to 5) by calculating the intensity of the frequency components in the chronological data on the sound signal through a Fourier transform. The CPU 82 inputs the state variables and the additional variables received in the process in S50 and the sound variables generated in the process in S52 into characteristic amounts F to be used as inputs to mapping prescribed in accordance with mapping data 83a stored in the storage device 83 illustrated in FIG. 1 to output the location of occurrence of an abnormal sound (S54). Next, the CPU 82 allocates the characteristic amounts F to respective input variables x (1) to x (38) for the mapping (S56).

The CPU 82 calculates an output of the mapping (S58). The mapping according to the present first embodiment is a neural network with a single intermediate layer that receives the input variables x (0) to x (38) as inputs. Particularly, the CPU 82 calculates output values for the "n1+1"-th dimension by inputting the input variables x (0) to x (38) to linear mapping prescribed in accordance with a coefficient wFjk (k=0 to 38, j=0 to n1), using the number n1 of nodes in the intermediate layer. The CPU 82 calculates a score original variable yi by inputting the output values to an activation function f to obtain an output value and inputting the obtained output value to linear mapping prescribed in accordance with a coefficient wSij (j=0 to n1) to obtain an output value corresponding to the score original variable yi. Examples of the activation function f include a rectified linear unit (ReLU) and a hyperbolic tangent. The input variable x (0) is a bias parameter, and a value of "1" is substituted into the input variable x (0) at all times.

Then, the CPU 62 calculates scores Sc (1), Sc (2), Sc (3), . . . by standardizing score original variables y1, y2, y3, . . . in accordance with a softmax function. Each of the scores Sc (2), Sc (3), Sc (4), . . . indicates the probability of the location of occurrence of the abnormal sound. The score Sc (1) indicates the probability that the abnormality cannot be specified as having occurred at the respective locations, the probability of which is indicated by the scores Sc (2), Sc (3), Sc (4), . . . .

Next, the CPU 82 extracts a score Sc (m) which is the largest one of the scores Sc (1), Sc (2), Sc (3), . . . (S60). The CPU 62 specifies the main cause of occurrence of the abnormal sound based on a variable m of the extracted score Sc (m) using main cause specifying data 83b stored in the storage device 83 illustrated in FIG. 1 (S62).

FIG. 9 illustrates an example of the relationship between the largest one of the scores Sc (1), Sc (2), Sc (3), . . . and the location of occurrence of the abnormal sound at that time, which is prescribed by the main cause specifying data 83b. FIG. 9 indicates that the determination result indicates that the location of occurrence of the abnormal sound cannot be specified as any of candidates for the location of occurrence prescribed in the main cause specifying data 83b in the case where the score Sc (1) is the largest. FIG. 9 also indicates that the determination result indicates that the location of occurrence of the abnormal sound is the oil pump 40 in the case where the score Sc (2) is the largest. FIG. 9 also indicates that the determination result indicates that the location of occurrence of the abnormal sound is the first motor generator 14 in the case where the score Sc (3) is the largest, and indicates that the determination result indicates that the location of occurrence of the abnormal sound is the second motor generator 16 in the case where the score Sc (4) is the largest. FIG. 9 also indicates that the determination result indicates that the location of occurrence of the abnormal sound is the meshing between the ring gear R and the carrier C of the power split device 10 in the case where the score Sc (5) is the largest, and indicates that the determination result indicates that the location of occurrence of the abnormal sound is the meshing between the sun gear S and the carrier C of the power split device 10 in the case where the score Sc (6) is the largest. FIG. 9 also indicates that the determination result indicates that the location of occurrence of the abnormal sound is the meshing of the counter gear of the speed change device 20 in the case where the score Sc (7) is the largest.

Returning to FIG. 6, when the main cause is specified, the CPU 82 notifies the portable terminal 60 of the specifying result by operating the communication device 88 (S64). In the case where the location of occurrence of the abnormal sound has been specified, the portable terminal 60 is notified of the result of specifying the location of occurrence and the action desired to be taken by the user. In the case where the location of occurrence of the abnormal sound has not been specified, the portable terminal 60 is notified of the fact that the location of occurrence of the abnormal sound has not been specified and the action desired to be taken by the user. Information about the action desired to be taken by the user may be information about which repair shop he/she should go to and when. This is implemented by configuring the main cause specifying data 83b so as to include information about handling methods by linking with the location of occurrence of an abnormal sound. In the process in S64, incidentally, not only the portable terminal 60 of the user but also the nearest repair shop may be informed of the specifying result in addition to the identification (ID) of the user.

In the case where the process in S64 is completed, the CPU 82 temporarily ends the sequence of processes indicated in FIG. 6.

When the user takes the vehicle to the repair shop thereafter, the specified location of occurrence is investigated in the case where the location of occurrence has been specified. In the case where the specifying result obtained in the process in S62 is correct, a part at the location of occurrence is replaced, for example. In the case where no abnormality is found at the location of occurrence specified in the process in S62, on the contrary, an investigation is made to find another main cause. In the case where the location of occurrence of the abnormal sound is specified as a result of the investigation, the CPU 82 updates the coefficients Wfj and wSij using a known method such that an error from teaching data, in which the score Sc for the newly specified location of occurrence of the abnormal sound is "1" and the scores Sc for the other locations are "0", is reduced for the input variables x (1) to x (38) set in the process in S56.

An investigation is made to find the main cause of the abnormal sound also in the case where the main cause of the abnormal sound was not specified in the process in S62. In the case where the location of occurrence of the abnormal sound is specified as a result of the investigation, the CPU 82 updates the coefficients Wfj and wSij such that an error from teaching data, in which the score Sc for the newly specified location of occurrence of the abnormal sound is "1" and the scores Sc for the other locations are "0", is reduced for the input variables x (1) to x (38) set in the process in S56.

Incidentally, the mapping data 83a at the time of shipment of a vehicle of certain specifications are a trained model trained through supervised learning performed using training data generated by generating an abnormal sound in a situation in which aging degradation of the vehicle is intentionally promoted in the prototyping stage of the vehicle.

The function and the effect of the present first embodiment will be described.

In the case where an abnormal sound is detected in the vehicle, the user starts the application program 63a of the portable terminal 60, and sends a signal indicating that an abnormal sound is generated when the abnormal sound is generated. Then, the portable terminal 60 receives state variables from the control device 50 when the CPU 62 executes the application program 63a, and records an ambient sound of the vehicle using the microphone 65, to store in the storage device 63 state variables for a predetermined period including a predetermined time before and after the timing when the signal is sent and a sound signal for that period by linking with each other. The CPU 62 transmits the state variables and the sound signal for the predetermined period to the data analysis center 80. The data analysis center 80 calculates scores Sc about main causes of the abnormal sound by generating a sound variable from the received sound signal and inputting the sound variable and the state variables to mapping prescribed in accordance with the mapping data 83a. The location of occurrence of the abnormal sound can be specified by specifying the largest one of the scores Sc as the main cause of occurrence of the abnormal sound.

According to the present first embodiment described above, the following functions and effects can be further obtained.

(1) A sound signal is acquired on condition that the microphone 65 is placed at the head portion of the driver's seat of the vehicle. Consequently, a sound signal can be acquired under the same condition as an abnormal sound detected by the driver.

(2) The sound variables include sound pressures Ima1, Imb1, Imc1, and Imd1 at frequencies related to meshing, and sound pressures Iman, Imbn, Imcn, and Imdn (n=2 to 5) of harmonic waves thereof. Consequently, an abnormal sound generated because of meshing can be specified precisely in the case where an abnormal sound is generated because of meshing, even if the dimension of the input variables for the mapping is low.

(3) The sound variables include the frequency of projection fpr and the amount of projection Ipr in view of the fact that an abnormal sound tends to occur in the case where there is a frequency band in which the intensity of the sound signal projects compared to frequency bands on the low-frequency side and the high-frequency side. Consequently, characteristic amounts related to the abnormal sound can be efficiently included in the sound variables, which makes it possible to reduce the dimension of the input variables for the mapping.

(4) The sound variables include the duration time T1 for which the intensity of the sound signal is equal to or more than a predetermined value. Consequently, a variable correlated with the time for which an abnormal sound is generated can be used as a sound variable. The duration time for which an abnormal sound is generated tends to fluctuate in accordance with the location of occurrence of the abnormal sound. Thus, using the duration time T1 as a sound variable can suppress an increase in the dimension of the input variables for the mapping in precisely specifying the location of occurrence of the abnormal sound.

(5) The state variables include the required torques Trqed, Trqmg1, and Trqmg2. Consequently, the specifying process can be executed using useful information for the state of the drive-system devices at the time when an abnormal sound is generated. Thus, it is possible to suppress an increase in the dimension of the input variables for the mapping in precisely specifying the location of occurrence of the abnormal sound.

(6) The state variables include the amounts of variation $\Delta$Trqed, $\Delta$Trqmg1, and $\Delta$Trqmg2. An abnormal sound tends to be generated when the amount of variation in torque becomes large. Thus, including the amounts of variation $\Delta$Trqed, $\Delta$Trqmg1, and $\Delta$Trqmg2 in the state variables allows variables that are useful in specifying a situation in which an abnormal sound is generated to be used as characteristic amounts, and hence can improve the precision in specifying the location of occurrence of an abnormal sound. In particular, by using the required torques Trqed, Trqmg1, and Trqmg2 and the amounts of variation $\Delta$Trqed, $\Delta$Trqmg1, and $\Delta$Trqmg2, it is possible to obtain information that is especially useful in grasping an abnormal sound, namely the amounts of variation $\Delta$Trqed, $\Delta$Trqmg1, and $\Delta$Trqmg2 at the time when the signs of the required torques Trqed, Trqmg1, and Trqmg2 are switched.

(7) The state variables include the speed ratio variable Vsft which indicates the speed ratio which is a variable that is effective in specifying the type of an abnormal sound. In the case where an abnormal sound is generated from a drive system of the vehicle, the abnormal sound is occasionally generated when the speed ratio of the speed change device 20 is a predetermined ratio. Therefore, including the speed ratio variable Vsft allows the characteristic amount which is useful in specifying a situation in which an abnormal sound is generated to be used as a state variable. Thus, it is possible to precisely specify the location of occurrence of the abnormal sound while reducing the dimension of the input variables for the mapping.

(8) The state variables include the vehicle speed SPD. An abnormal sound generated in the vehicle is occasionally generated at a specific vehicle speed SPD. Therefore, including the vehicle speed SPD in the state variables allows the characteristic amount which is useful in specifying a situation in which an abnormal sound is generated to be used as a state variable. Thus, it is possible to precisely specify the location of occurrence of the abnormal sound while reducing the dimension of the input variables for the mapping.

(9) The state variables include the rotational speeds NE, Nm1, and Nm2. The rotational speeds NE, Nm1, and Nm2 are variables that are effective in specifying the state of the drive-system devices. Thus, using such rotational speeds as state variables makes it possible to precisely specify the location of occurrence of the abnormal sound while reducing the dimension of the input variables for the mapping.

(10) The state variables include the cancel torque Trqcan. There occurs a significant difference in vibration due to fluctuations in torque of the crankshaft 12a of the internal combustion engine 12 between the case where control is performed so as to apply the cancel torque Trqcan and the case where such control is not performed. Thus, in the case where an abnormal sound is generated, the main cause of occurrence of the abnormal sound may be different in accordance with whether control is performed so as to apply the cancel torque Trqcan at that time. Therefore, by including the cancel torque Trqcan in the state variables allows the characteristic amount which is appropriate in grasping the magnitude of vibration due to torque fluctuations to be used as a state variable. Thus, it is possible to enhance the precision in specifying the location of occurrence of an abnormal sound.

(11) The state variables include the push torque Trqpush. There occurs a significant difference in noise due to play in the gear train of the power split device 10 between the case where control is performed so as to apply the push torque Trqpush and the case where such control is not performed. Thus, in the case where an abnormal sound is generated, the main cause of occurrence of the abnormal sound may be different in accordance with whether control is performed so as to apply the push torque Trqpush at that time. Therefore, by including the push torque Trqpush in the state variables allows the characteristic amount which is appropriate in grasping the magnitude of vibration due to torque fluctuations to be used as a state variable. Thus, it is possible to enhance the precision in specifying the location of occurrence of an abnormal sound.

(12) The characteristic amounts to be used as the input variables for the mapping are selected based on the findings by an expert. Therefore, the structure of the mapping can be simplified, such as by reducing the number of intermediate layers of a neural network, compared to the case where variables that specify the state of the drive system and sound variables generated from a sound signal are used as the characteristic amounts in random.

(13) The CPU 62 receives state variables from the control device 50, and transmits the state variables, which are linked with a sound signal, to the data analysis center 80. Consequently, the data analysis center 80 can collect events caused in a plurality of vehicles. Thus, it is possible to improve the frequency of retraining of the mapping data 83*a* such that the precision in specifying the location of occurrence of an abnormality can be improved.

(14) The CPU 62 transmits, to the data analysis center 80, the window variable Vw and the identification variable Vst in addition to the state variables and the sound signal. Consequently, it is possible to provide the mapping with detailed information on the situation of occurrence of the abnormal sound, and hence to precisely specify the location of occurrence of the abnormal sound, compared to the case where the window variable Vw and the identification variable Vst are not used.

(15) The CPU 62 of the portable terminal 60 executes the application program 63*a* to receive state variables from the control device 50 and transmit the state variables, which are linked with a sound signal, to the data analysis center 80. Consequently, it is only necessary for the user to install the application program 63*a* in the portable terminal 60 in the case where an abnormal sound is generated, for example. Therefore, redundancy can be suppressed compared to the case where the control device 50 is provided in advance with a function of transmitting state variables, which are linked with a sound signal, to the data analysis center 80, for example, for rare cases in which an abnormal sound is generated.

A second embodiment of the present disclosure will be described below with reference to the drawings, mainly with regard to differences from the first embodiment.

In the first embodiment described above, the main cause of an abnormality is specified based on the largest one of the scores Sc (1), Sc (2), Sc (3), . . . . In the present second embodiment, meanwhile, the sound signal and the state variables are acquired in a specific drive state, in the case where two of the scores Sc (1), Sc (2), Sc (3), . . . have large values compared to the others, in order to specify which are the two.

Figure 10A:
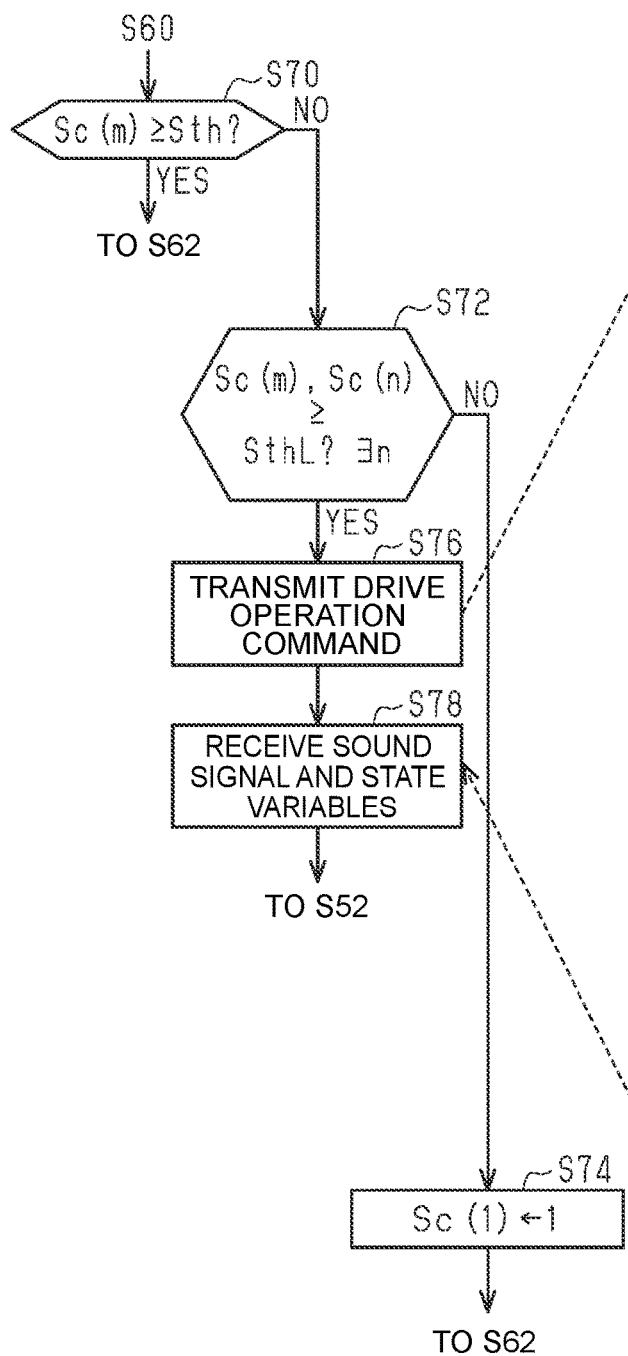
FIG. 10A is a flowchart illustrating the procedures of processes executed by a data analysis center of a system according to a second embodiment of the present disclosure.
Figure 10B:
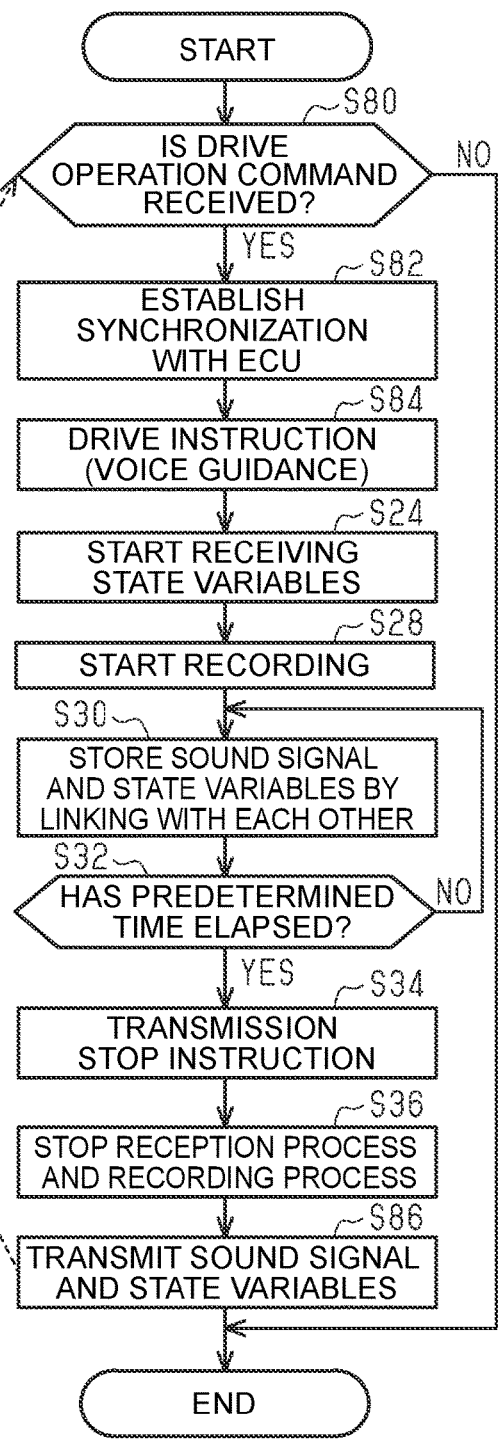
FIG. 10B is a flowchart illustrating the procedures of processes executed by a portable terminal of the system.

FIGS. 10A and 10B illustrate the procedures of processes that are peculiar to the present second embodiment, among the processes executed by the data analysis center 80 and the portable terminal 60. The processes indicated in FIG. 10A are implemented when the CPU 82 executes the program stored in the ROM 84 repeatedly at predetermined periods, for example. In FIG. 10A, a portion changed from the processes in FIG. 6 is indicated. On the other hand, the processes indicated in FIG. 10B are implemented when the CPU 62 executes the program stored in the ROM 64 repeatedly at predetermined periods, for example. Among the processes indicated in FIG. 10B, processes corresponding to the processes indicated in FIG. 2B are given the same step numbers for convenience.

In the sequence of processes indicated in FIG. 10A, the CPU 82 first determines whether the score Sc (m), which is the largest one of the scores Sc (1), Sc (2), Sc (3), . . . and which is selected in the process in S60, is equal to or more than a threshold Sth (S70). In this process, it is determined whether the reliability of main causes specified by a variable m corresponding to the score Sc (m) and the main cause specifying data 83*b* is equal to or more than a predetermined level. In the case where it is determined that the score Sc (m) is equal to or more than the threshold Sth, the CPU 82 proceeds to S62.

In the case where it is determined that the score Sc (m) is not equal to or more than the threshold Sth (S70: NO), on the other hand, the CPU 82 determines whether the score Sc (m) which is the largest value and a specific score Sc (n) other than the score Sc (m) are equal to or more than a predetermined value SthL which is less than the threshold Sth (S72). The predetermined value SthL is set such that the difference between the scores Sc (m) and Sc (n) and the other scores is equal to or more than a predetermined level. This means that the reliability of either of the main causes specified by the variables m and n being the actual main cause is equal to or more than the predetermined level.

In the case where it is determined that the score Sc (m) and the score Sc (n) are equal to or more than the predetermined value SthL (S72: YES), the CPU 82 searches for a drive operation command for the vehicle for identifying which of the main causes specified by the variables m and n is the actual main cause based on the main cause specifying data 83*b*, and transmits the drive operation command found in the search to the portable terminal 60 by operating the communication device 88 (S76).

Meanwhile, as illustrated in FIG. 10B, the CPU 62 determines whether the drive operation command is received (S80). In the case where it is determined that the drive operation command is received (S80: YES), the CPU 62 resumes the process of establishing synchronization with the control device 50 (S82). The CPU 62 provides voice guidance for instructing the user to drive in accordance with the received drive operation command by operating the speaker SP (S84). The CPU 62 starts receiving state variables at the time when the user performs a drive operation in accordance with the drive instruction (S24). Next, the CPU 62 executes the processes in S28 to S36. It should be noted, however, that the process in S32 here is a process of determining whether a predetermined length of time has elapsed since recording is started.

In the case where the process in S36 is completed, the CPU 62 transmits the sound signal and the state variables stored in the process in S30 to the data analysis center 80 by operating the communication device 68 (S86). The CPU 62 temporarily ends the sequence of processes indicated in FIG. 10B in the case where the process in S86 is completed or in the case where a negative determination is made in the process in S80.

Meanwhile, as illustrated in FIG. 10A, the CPU 82 receives the state variables and the sound signal which are transmitted in the process in S86 (S78), and executes the processes in S52 to S64 in FIG. 6. In the case where a negative determination is made in the process in S72, on the other hand, the CPU 62 substitutes "1" into the score Sc (1) (S74), and proceeds to the process in S62.

In the present second embodiment, in this manner, the user is prompted to perform a predetermined drive operation when it is impossible to precisely identify which of the main causes corresponding to the variables m and n is the actual main cause, and the scores Sc (1), Sc (2), Sc (3), . . . are calculated again based on the sound signal and the state variables at the time when the predetermined drive operation is performed. Consequently, it is possible to precisely identify which of the main causes corresponding to the variables m and n is the actual main cause.

A third embodiment of the present disclosure will be described below with reference to the drawings, mainly with regard to differences from the first embodiment.

In the first embodiment described above, when the user detects an abnormal sound, state variables and a sound signal are transmitted to the data analysis center 80 using the portable terminal 60 so that the data analysis center 80 specifies the main cause of the abnormal sound. In the present third embodiment, meanwhile, the user takes the vehicle to a repair shop to be handled.

Figure 11:
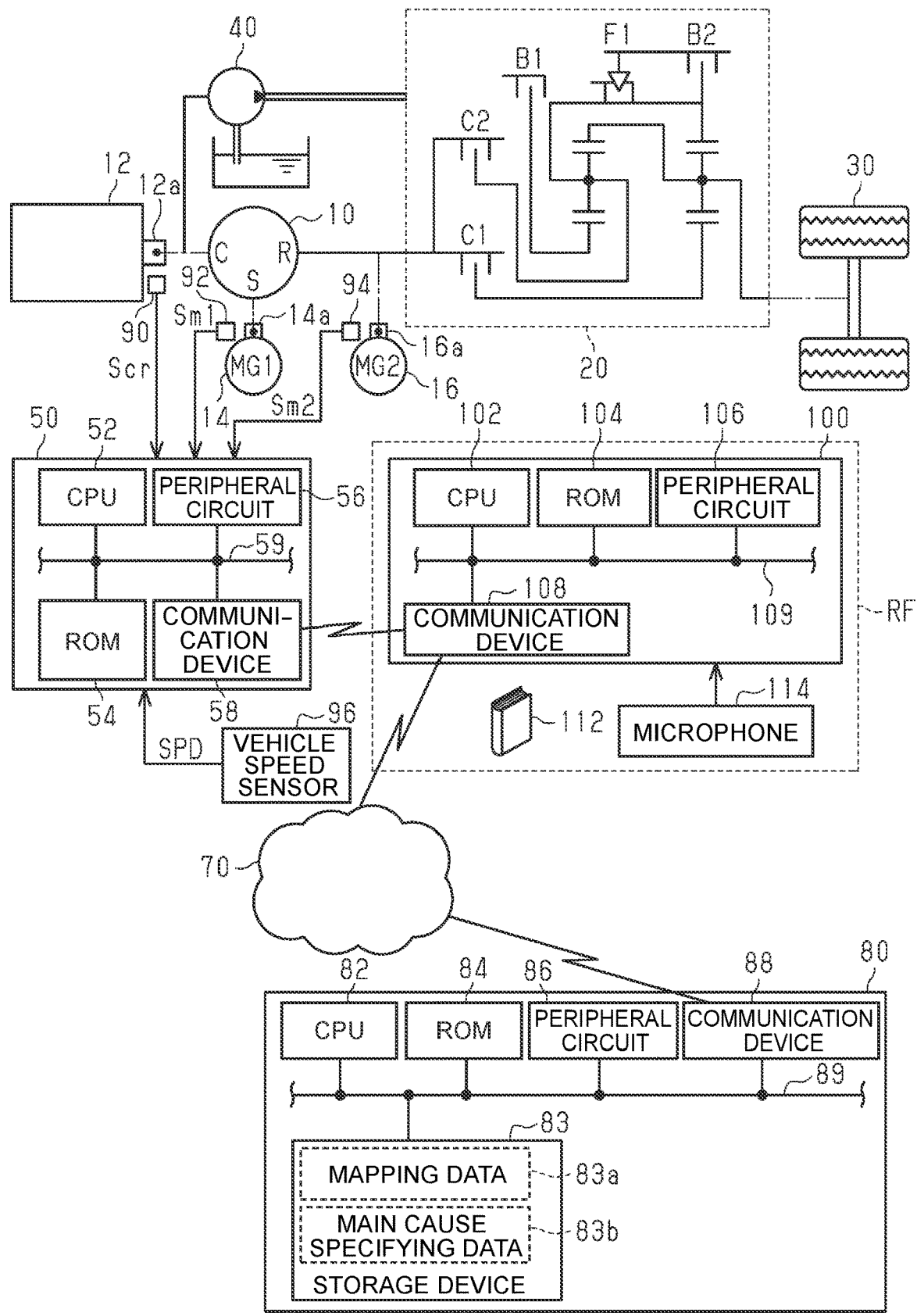
FIG. 11 is a block diagram illustrating the configuration of a system according to a third embodiment of the present disclosure.

FIG. 11 illustrates the configuration of a system that specifies the location of occurrence of an abnormal sound according to the present third embodiment. In FIG. 11, members corresponding to the members illustrated in FIG. 1 are given the same reference signs for convenience.

As illustrated in FIG. 11, a scan tool 100 at a repair shop RF includes a CPU 102, a ROM 104, a peripheral circuit 106, and a communication device 108, which can communicate with each other via a local network 109. The communication device 108 has a function of communicating with the communication device 58. Communication with the control device 50 may be made through a wired connection which utilizes a dedicated terminal of the control device 50, for example.

The repair shop RF also includes a manual 112 for handling an abnormality. This manual describes the location of placement of a microphone 114 and the location of placement of the vehicle.

Figure 12:
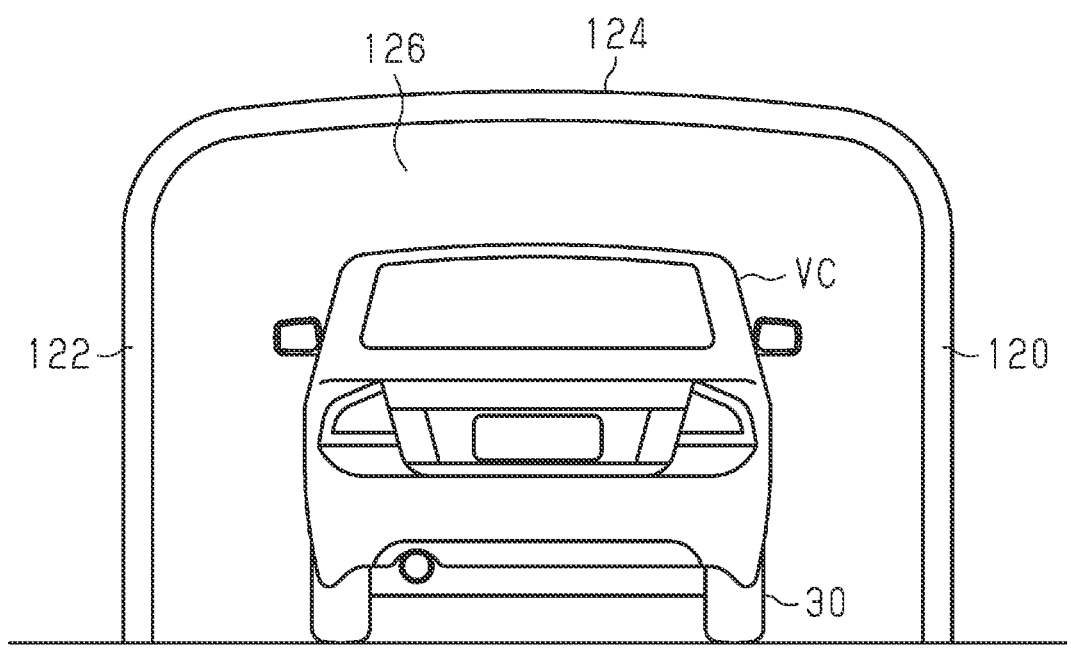
FIG. 12 illustrates an example of the placement of a vehicle according to the third embodiment.

In particular, the manual 112 indicates that recording is performed with the microphone 114 placed with a vehicle VC placed as illustrated in FIG. 12 as an example of the placement of the vehicle for recording. FIG. 12 illustrates an example in which the right side of the vehicle VC faces a side wall 120, the left side of the vehicle VC faces a side wall 122, the upper side of the vehicle VC faces a ceiling 124, and the front side of the vehicle VC faces a front wall 126. That is, in the example illustrated in FIG. 12, the vehicle VC is surrounded on the upper, lower, right, left, and front sides.

The reason for designating such an arrangement is that, in the case where the vehicle VC is placed in a shed, noise generated in the vehicle VC is reflected by walls of the shed and thus an abnormal sound tends to be detected by the user compared to the case where the vehicle VC is in a non-surrounded state. That is, if the user detects an abnormal sound when the vehicle VC is in a shed and takes the vehicle to the repair shop RF, the abnormal sound may not be reproduced in the case where the vehicle VC is placed in a non-surrounded location, even if it is attempted to reproduce the abnormal sound generated in the vehicle VC in the repair shop RF. Thus, the manual 112 prescribes that recording is performed with the vehicle surrounded from at least two, upper and lower, directions and from at least three directions out of the four, front, rear, right, and left, directions. The manual 112 also prescribes that it is more desirable that recording should be performed with the vehicle surrounded from all directions that are the front, rear, right, left, upper and lower directions.

The scan tool 100 executes processes corresponding to the processes executed by the portable terminal 60 in the first embodiment described above. Consequently, the sound signal, the state variables, and the additional variables can be acquired at the repair shop, and transmitted to the data analysis center 80.

The correspondence between the matters in the first embodiment described above and the matters described in the "SUMMARY" field is as follows. The storage device corresponds to the storage device 83. The execution device corresponds to the CPUs 52, 62, and 82 and the ROMs 54, 64, and 84 in FIG. 1, and the CPUs 52, 82, and 102 and the ROMs 54, 84, and 104 in FIG. 11. The sound signal acquisition process corresponds to the processes in S26 to S30. The state variable acquisition process corresponds to the process in S12. The specifying process corresponds to the processes in S54 to S62. The instruction process corresponds to the processes in S76 and S84. The rotary machine corresponds to the internal combustion engine 12, the first motor generator 14, and the second motor generator 16. The intensity of predetermined frequency components corresponds to the sound pressures Ima1, Imb1, Imc1, and Imd1. The intensity of frequency components which are integer multiples of a predetermined frequency correspond to the sound pressures Ima2 to Ima5, Imb2 to Imb5, Imc2 to Imc5, and Imd2 to Imd5. The duration time corresponds to the duration time T1. The torque corresponds to the required torques Trqed, Trqmg1, and Trqmg2. The amounts of variation correspond to the amounts of variation $\Delta$Trqed, $\Delta$Trqmg1, and $\Delta$Trqmg2. Corresponds to transmitting the speed ratio variable Vsft in the process in S12. The rotational speed of the rotary machine corresponds to the rotational speeds NE, Nm1, and Nm2. The control device corresponds to the control device 50. The magnitude of the cancel torque corresponds to the cancel torque Trqcan. The control device corresponds to the control device 50. The magnitude of the push torque corresponds to the push torque Trqpush. The first execution device corresponds to the CPU 52 and the ROM 54. The second execution device corresponds to the CPU 62 and the ROM 64. The third execution device corresponds to the CPU 82 and the ROM 84. The state variable acquisition process corresponds to the process in S12. The state variable transmission process corresponds to the process in S14. The state variable reception process corresponds to the process in S24. The terminal-side transmission process corresponds to the process in S40. The analysis-side reception process corresponds to the process in S50. The notification acquisition process corresponds to the process in S28. The additional variable acquisition process corresponds to the process in S38. The additional variables correspond to the window variable Vw and the identification variable Vst. The application program corresponds to the application program 63a. The in-vehicle device corresponds to the control device 50.

The embodiments may be modified as follows. The embodiments and the following modifications can be combined with each other unless such embodiments and modifications technically contradict with each other.

The sound variables will be described below.

The intensity of frequency components related to meshing is not limited to the intensity of four frequency components a to d related to meshing. For example, the intensity of frequency components related to meshing may be the intensity of five or more frequency components related to different meshing. In addition, the intensity of higher-order frequency components, of the intensity of frequency components related to meshing, is not limited to the intensity of first-order to fourth-order components. For example, the intensity of higher-order frequency components may be the intensity of first-order to third-order components, or may be the intensity of first-order to fifth-order components, for example. In the case where the intensity of frequency components related to a plurality of types of meshing is used as a characteristic amount, different higher-order components may be adopted for frequency components related to different types of meshing, such as first-order to fifth-order components for frequency component a related to meshing and first-order to third-order components for frequency component b, for example.

The intensity of frequency components related to meshing is not limited to the intensity of fundamental frequency components and the intensity of higher-order components. For example, the intensity of half-order components may also be included. In addition, the intensity of only predetermined order components may be used, such as use of only the intensity of fundamental frequency components.

The sound variables are not limited to those which use variables of all categories indicated in the embodiments described above. For example, the duration time T1 may be excluded, or the frequency of projection fpr and the amount of projection Ipr may be excluded.

In the case where deep learning is performed etc. as described in "Mapping Data", chronological data on the sound signal themselves may be used as the sound variable.

Next, the sound variable generation process will be described.

While the sound variables are generated in the data analysis center 80 in the embodiments described above, the present disclosure is not limited thereto. For example, the sound variables may be generated in the portable terminal 60, and transmitted from the portable terminal 60 to the data analysis center 80.

Next, the state variables will be described.

The state variables are not limited to use of all variables indicated in the embodiments described above. For example, the state variables may include the speed ratio variable Vsft and the rotational speeds NE, Nm1, and Nm2, but may not include the vehicle speed SPD.

It is not essential that all the state variables acquired from the control device 50 should be input to the mapping. For example, the speed ratio variable Vsft and the rotational speeds NE, Nm1, and Nm2 may be used to calculate a frequency related to meshing, but may not be input to the mapping.

It is also not essential that all the state variables should be generated by the control device 50. For example, if the control device 50 transmits the required torques Trqed, Trqmg1, and Trqmg2 at short periods, the portable terminal 60 or the data analysis center 80 may generate the amounts of variation ΔTrqed, ΔTrqmg1, and ΔTrqmg2 from chronological data on the required torques Trqed, Trqmg1, and Trqmg2.

Next, linking between the state variables and the sound signal will be described.

In the embodiments described above, a set of the sound signal and the state variables corresponding to a predetermined period is determined as data to be utilized to specify the location of occurrence of an abnormal sound so that the sound signal and the state variables are linked with each other. However, the present disclosure is not limited thereto. For example, the CPU 62 may store chronological data on the sound signal at a desired timing by linking with chronological data on the state variables at the corresponding timing. This may be implemented by defining the numbers in the parentheses as a label variable that identifies different times and determining chronological data Ds (1), Ds (2), . . . on the sound signal and chronological data VS (1), VS (2), . . . on the state variables with the same label variable as data at the same timing, or applying a time stamp to each of the data.

Next, the notification process will be described.

It is not essential to use a set of the sound signal and the state variables for a predetermined period prescribed in accordance with the timing at which the user gives a signal. For example, input data for the mapping may be generated using a set of data on the sound signal and the state variables synchronized with the sound signal successively at predetermined periods. In that case, in the case where the mapping is constituted of a trained model, the score Sc (1) may be "1" and the rest may be "0", for example, for the teaching data at the time when no abnormal sound is generated.

Next, the location of placement of the microphone will be described.

Figure 13A:
FIG. 13A illustrates an example of an instruction for the location of placement of the portable terminal according to a first modification of the embodiment.
Figure 13B:
FIG. 13B illustrates an example of an instruction for the location of placement of the portable terminal according to a second modification of the embodiment.
Figure 13C:
FIG. 13C illustrates an example of an instruction for the location of placement of the portable terminal according to a third modification of the embodiment.

In the embodiments described above, the sound signal is acquired with the microphone 65 placed at the head portion of the driver's seat. However, the present disclosure is not limited thereto. For example, the microphone may be placed on the dashboard. Alternatively, the microphone may be placed at the middle portion of the rear seats, for example. Further, the microphone may be placed at the center console, for example. FIGS. 13A to 13C illustrate examples of display on the display unit 67 of the portable terminal 60 according to first to third modifications.

Next, the main cause specifying data will be described.

FIG. 9 indicates an example in which the location of an abnormality cannot be specified or the location of an abnormality is indicated. However, the present disclosure is not limited thereto. For example, a determination result indicating that the abnormal sound is noise within the scope of assumption due to temporal variations etc. may be included. Consequently, the user can be informed that the detected sound is attributable to natural temporal variations and it is assumed that a similar sound will be generated again soon even if repair is performed.

Next, candidates for the location of an abnormality will be described.

The candidates for the location of an abnormality are not limited to those indicated in FIG. 9.

Next, the mapping data will be described.

The neural network is not limited to a feedforward network with a single intermediate layer. For example, the neural network may be a network with two or more intermediate layers. Alternatively, the neural network may be a convolutional neural network or a recurrent neural network, for example. In the case where deep learning is performed, for example, the characteristic amounts are not limited to use of processed sound variables such as the amount of projection Ipr, the frequency of projection fpr, and the sound pressures Ima1 to Ima5 of frequency components related to meshing, and chronological data on the sound signal themselves may be used as sound variables to be input to the neural network.

In the case where chronological data on the sound signal are input to the neural network, the respective rotational speeds of the gears of the power split device 10 can be grasped by including the rotational speeds NE, Nm1, and Nm2 in inputs to the neural network. Therefore, it is possible to specify an abnormal sound due to meshing of the power split device 10 in consideration of information on the frequency related to meshing of the power split device 10 through deep learning. In addition, the respective rotational speeds of the gears of the speed change device 20 can be grasped by further including the speed ratio variable Vsft in the inputs. Thus, it is possible to specify an abnormal sound due to meshing of the speed change device 20 in consideration of information on the frequency related to meshing of the speed change device 20 through deep learning.

In the case where deep learning is performed, for example, chronological data on the required torques Trqed, Trqmg1, and Trqmg2 may be used as the input variables for the neural network, without using human-processed characteristic amounts such as the amounts of variation ΔTrqed, ΔTrqmg1, and ΔTrqmg2 in torque and the cancel torque Trqcan. In the case where chronological data on the sound signal and chronological data on the state variables are input to the neural network, it is desirable to specify which input variable data linked at the same timing are substituted into, by linking data that constitute such chronological data with each other as described in "Linking between State Variables and Sound Signal".

The model trained through machine learning is not limited to a neural network. For example, a support vector machine may be adopted, and support vectors may be used as learned data instead of using the coefficients wFjk and wSij as learned data. In other words, representative ones from a set of characteristic amounts may be used as learned data.

The trained model is not limited to a model that outputs the probability that a candidate for the location of occurrence of an abnormal sound is the actual location of occurrence of the abnormal sound. For example, the trained model may be an identification model that indicates which candidate is the location of occurrence of an abnormal sound.

The mapping data are not limited to those obtained through machine learning, and may be data that include chronological data on the sound signal corresponding to the location of occurrence of an abnormal sound, for example. In that case, the location of an abnormality may be specified through pattern matching with chronological data on the actual sound signal.

Next, a system that specifies the location of occurrence of an abnormal sound will be described.

The system that specifies the location of occurrence of an abnormal sound is not limited to those illustrated in FIGS. 1 and 11. For example, in the process in FIG. 11, a terminal at the repair shop RF may include the mapping data 83a etc. so that a process of specifying the location of occurrence of an abnormal sound may be performed at the repair shop RF.

Other modifications will be described below.

The vehicle as the target for determination of an abnormal sound is not limited to a series-parallel hybrid vehicle, and may be a series hybrid vehicle or a parallel hybrid vehicle. It should be noted, however, that the present disclosure is not limited thereto, and the vehicle with a thrust generation device may be a vehicle that includes only an internal combustion engine, an electric vehicle, and a fuel cell vehicle.

The cancel torque Trqcan is not limited to torque allocated to the first motor generator 14 and the second motor generator 16, and may be generated by a predetermined one of the first motor generator 14 and the second motor generator 16.

What is claimed is:

1. A method of specifying a location of occurrence of an abnormal sound, the method comprising:
    storing mapping data in a storage device, the mapping data prescribing mapping that receives, as inputs, a sound variable, which is a variable that matches a sound detected in a vehicle, and a state variable of a drive-system device of the vehicle, which is synchronized with the sound, and that outputs a location as a main cause of the sound;
    causing an execution device to execute a sound signal acquisition process of acquiring a sound signal output from a microphone that detects the sound in the vehicle for which the mapping data is stored;
    causing the execution device to execute a state variable acquisition process of acquiring the state variable of the drive-system device for which the mapping data is stored; and
    causing the execution device to execute a specifying process of specifying the location of occurrence of the sound corresponding to the sound signal using the sound variable that is based on the sound signal acquired through the sound signal acquisition process, and the state variable, that is synchronized with the sound signal, as the inputs,
    wherein the state variable acquisition process includes a process of acquiring, as the state variable, at least one of torque of a thrust generation device of the vehicle and an amount of variation in the torque per unit time.

2. The method according to claim 1, wherein:
    the sound signal acquisition process includes a process of acquiring the sound signal on condition that the microphone is placed at a predetermined location specified in advance; and
    the predetermined location is one of a head portion of a driver's seat of the vehicle, a dashboard, a middle portion of a rear seat, and a center console.

3. The method according to claim 1, wherein:
    the sound signal acquisition process includes a process of acquiring the sound signal with the vehicle in a placement state determined in advance; and
    the placement state determined in advance is a state in which the vehicle is surrounded from at least three out of four directions, the four directions including front, rear, right, and left sides of the vehicle, and two directions including upper and lower sides of the vehicle.

4. The method according to claim 1, further comprising:
    causing the execution device to execute an instruction process of providing an instruction for a prescribed drive operation determined in advance for the vehicle when an output of the mapping indicates that probabilities of two or more of a plurality of candidates for the location as the main cause of the abnormal sound are higher than probabilities of other candidates by a predetermined value or more, the mapping outputting a variable that indicates respective relative probabilities of the candidates,
    wherein the specifying process includes a process of specifying the location of occurrence of the sound corresponding to the sound signal, when the instruction process is performed, using the sound variable that is based on the sound signal acquired through the sound signal acquisition process performed when the drive operation according to the instruction process is performed, and the state variable that is acquired through the state variable acquisition process, as the inputs.

5. The method according to claim 1, further comprising executing a sound variable generation process of receiving the sound signal as an input and generating, as the sound variable, at least one of three including an intensity of frequency components of the sound signal respectively corresponding to a predetermined frequency that is proportional to a rotational frequency of a rotary machine as a thrust generation device of the vehicle acquired through the state variable acquisition process and frequencies that are integer multiples of the predetermined frequency, a frequency of projection that is a frequency in a frequency band in which an intensity of the sound signal is high compared to frequency bands on a low-frequency side and a high-frequency side that are adjacent to the frequency band and an amount of projection which is an amount of projection of the intensity at the frequency of projection with respect to the adjacent frequency bands, and a duration time for which the intensity of the sound signal is equal to or more than a predetermined value.

6. The method according to claim 1, wherein the state variable acquisition process includes a process of acquiring, as the state variable, at least one of a vehicle speed and a rotational speed of a rotary machine as a thrust generation device of the vehicle.

7. The method according to claim 1, wherein:
the vehicle includes an internal combustion engine, a rotary electric machine that is mechanically connectable to a crankshaft of the internal combustion engine, and a control device that executes a superposing process of superposing cancel torque, which is torque for reducing pulsation in torque of the internal combustion engine, on torque required for the rotary electric machine; and
the state variable acquisition process includes a process of acquiring a magnitude of the cancel torque as the state variable.

8. The method according to claim 1, wherein:
the vehicle includes an internal combustion engine, a first motor generator, a second motor generator, and a control device;
the second motor generator is mechanically connectable to the internal combustion engine and the first motor generator via a power split device, and mechanically coupled to drive wheels not via the power split device;
the control device executes a process of causing the first motor generator to generate push torque for filling play in a gear train of the power split device during no-load operation of the internal combustion engine and the first motor generator; and
the state variable acquisition process includes a process of acquiring a magnitude of the push torque as the state variable.

9. A method of specifying a location of occurrence of an abnormal sound, the method comprising:
storing mapping data in a storage device, the mapping data prescribing mapping that receives, as inputs, a sound variable, which is a variable that matches a sound detected in a vehicle, and a state variable of a drive-system device of the vehicle, which is synchronized with the sound, and that outputs a location as a main cause of the sound;
causing an execution device to execute a sound signal acquisition process of acquiring a sound signal output from a microphone that detects the sound in the vehicle for which the mapping data is stored;
causing the execution device to execute a state variable acquisition process of acquiring the state variable of the drive-system device for which the mapping data is stored; and
causing the execution device to execute a specifying process of specifying the location of occurrence of the sound corresponding to the sound signal using the sound variable that is based on the sound signal acquired through the sound signal acquisition process, and the state variable, that is synchronized with the sound signal, as inputs to the mapping, wherein:
the execution device includes a first execution device provided in the vehicle, and a second execution device and a third execution device not provided in the vehicle;
the first execution device executes the state variable acquisition process and a vehicle-side transmission process of transmitting the state variable acquired through the state variable acquisition process;
the second execution device is a portable terminal of a user of the vehicle which includes the microphone, and executes a state variable reception process of receiving the state variable transmitted through the vehicle-side transmission process, the sound signal acquisition process, and a terminal-side transmission process of transmitting the sound signal acquired through the sound signal acquisition process and the state variable received through the state variable reception process; and
the third execution device executes an analysis-side reception process of receiving the sound signal and the state variable transmitted through the terminal-side transmission process from each of portable terminals of users of a plurality of vehicles, and the specifying process.

10. The method according to claim 9, wherein:
the second execution device executes a notification acquisition process of acquiring a notification indicating, when a person has detected the abnormal sound, that the person has detected the abnormal sound; and
the sound signal to be transmitted through the terminal-side transmission process is the sound signal acquired through the sound signal acquisition process in a predetermined period determined in accordance with a timing when the notification is acquired through the notification acquisition process.

11. The method according to claim 9, wherein:
the second execution device executes an additional variable acquisition process of acquiring an additional variable which is a variable that indicates at least one of an opening and closing state of a window of the vehicle at a time when the abnormal sound is detected and a situation of the vehicle;
the terminal-side transmission process includes a process of transmitting the additional variable in addition to the sound signal and the state variable;
the analysis-side reception process includes a process of receiving the additional variable;
the inputs to the mapping include the additional variable in addition to the sound variable and the state variable; and
the specifying process includes a process of specifying the location of occurrence of the sound corresponding to the sound signal using the sound variable, the state variable, and the additional variable as the inputs to the mapping.

12. A method of specifying a location of occurrence of an abnormal sound, the method comprising:
storing mapping data in a storage device, the mapping data prescribing mapping that receives, as inputs, a sound variable, which is a variable that matches a sound detected in a vehicle, and a state variable of a drive-system device of the vehicle, which is synchronized with the sound, and that outputs a location as a main cause of the sound;
causing an execution device to execute a sound signal acquisition process of acquiring a sound signal output from a microphone that detects the sound in the vehicle for which the mapping data is stored;
causing the execution device to execute a state variable acquisition process of acquiring the state variable of the drive-system device for which the mapping data is stored; and
causing the execution device to execute a specifying process of specifying the location of occurrence of the sound corresponding to the sound signal using the sound variable that is based on the sound signal acquired through the sound signal acquisition process, and the state variable, that is synchronized with the sound signal, as inputs to the mapping, wherein:
the vehicle includes a speed change device that changes a ratio between a rotational speed of a rotary machine as a thrust generation device and a rotational speed of drive wheels; and
the state variable acquisition process includes a process of acquiring a speed ratio of the speed change device as the state variable.

13. The method according to claim 12, wherein:
the sound signal acquisition process includes a process of acquiring the sound signal on condition that the microphone is placed at a predetermined location specified in advance; and
the predetermined location is one of a head portion of a driver's seat of the vehicle, a dashboard, a middle portion of a rear seat, and a center console.

14. The method according to claim 12, wherein:
the sound signal acquisition process includes a process of acquiring the sound signal with the vehicle in a placement state determined in advance; and
the placement state determined in advance is a state in which the vehicle is surrounded from at least four directions excluding one direction, the four directions including front, rear, right, and left sides of the vehicle, and two directions including upper and lower sides of the vehicle.

15. The method according to claim 12, further comprising:
causing the execution device to execute an instruction process of providing an instruction for a prescribed drive operation determined in advance for the vehicle when an output of the mapping indicates that probabilities of two or more of a plurality of candidates for the location as the main cause of the abnormal sound are higher than probabilities of other candidates by a predetermined value or more, the mapping outputting a variable that indicates respective relative probabilities of the candidates,
wherein the specifying process includes a process of specifying the location of occurrence of the sound corresponding to the sound signal, when the instruction process is performed, using the sound variable that is based on the sound signal acquired through the sound signal acquisition process performed when the drive operation according to the instruction process is performed, and the state variable that is acquired through the state variable acquisition process, as the inputs to the mapping.

16. The method according to claim 12, further comprising executing a sound variable generation process of receiving the sound signal as an input and generating, as the sound variable, at least one of three including an intensity of frequency components of the sound signal respectively corresponding to a predetermined frequency that is proportional to a rotational frequency of a rotary machine as a thrust generation device of the vehicle acquired through the state variable acquisition process and frequencies that are integer multiples of the predetermined frequency, a frequency of projection that is a frequency in a frequency band in which an intensity of the sound signal is high compared to frequency bands on a low-frequency side and a high-frequency side that are adjacent to the frequency band and an amount of projection which is an amount of projection of the intensity at the frequency of projection with respect to the adjacent frequency bands, and a duration time for which the intensity of the sound signal is equal to or more than a predetermined value.

17. The method according to claim 12, wherein the state variable acquisition process includes a process of acquiring, as the state variable, at least one of a vehicle speed and a rotational speed of a rotary machine as a thrust generation device of the vehicle.

18. The method according to claim 12, wherein:
the vehicle includes an internal combustion engine, a rotary electric machine that is mechanically connectable to a crankshaft of the internal combustion engine, and a control device that executes a superposing process of superposing cancel torque, which is torque for reducing pulsation in torque of the internal combustion engine, on torque required for the rotary electric machine; and
the state variable acquisition process includes a process of acquiring a magnitude of the cancel torque as the state variable.

19. The method according to claim 12, wherein:
the vehicle includes an internal combustion engine, a first motor generator, a second motor generator, and a control device;
the second motor generator is mechanically connectable to the internal combustion engine and the first motor generator via a power split device, and mechanically coupled to drive wheels not via the power split device;
the control device executes a process of causing the first motor generator to generate push torque for filling play in a gear train of the power split device during no-load operation of the internal combustion engine and the first motor generator; and
the state variable acquisition process includes a process of acquiring a magnitude of the push torque as the state variable.

* * * * *